(12) United States Patent
Allam et al.

(10) Patent No.: US 9,193,880 B2
(45) Date of Patent: Nov. 24, 2015

(54) ADHESION PROMOTION ADDITIVES AND METHODS FOR IMPROVING COATING COMPOSITIONS

(75) Inventors: Dominic J. Allam, Canton, MI (US); Kiran K. Baikerikar, Midland, MI (US); Syed Z. Mahdi, Rochester Hills, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 728 days.

(21) Appl. No.: 11/959,107

(22) Filed: Dec. 18, 2007

(65) Prior Publication Data

US 2008/0145564 A1    Jun. 19, 2008

Related U.S. Application Data

(60) Provisional application No. 60/870,641, filed on Dec. 19, 2006.

(51) Int. Cl.
| | |
|---|---|
| *C08G 77/20* | (2006.01) |
| *C09D 7/12* | (2006.01) |
| *C09D 11/03* | (2014.01) |
| *C08K 5/544* | (2006.01) |

(52) U.S. Cl.
CPC .............. *C09D 7/1233* (2013.01); *C09D 11/03* (2013.01); *C08K 5/544* (2013.01)

(58) Field of Classification Search
CPC ....... C09D 7/1233; C09D 11/03; C08K 5/544
USPC ............................................. 427/514; 528/32
See application file for complete search history.

(56) References Cited

U.S. PATENT DOCUMENTS

| | | | |
|---|---|---|---|
| 3,152,162 A | 10/1964 | Fischer et al. | |
| 3,549,396 A | 12/1970 | Dietz | |
| 3,743,626 A | 7/1973 | Emmons | |
| 4,072,340 A | 2/1978 | Morgan | |
| 4,122,074 A | 10/1978 | Pepe et al. | |
| 4,232,088 A | 11/1980 | Humphrey, Jr. | |
| 4,374,210 A | 2/1983 | Ewen et al. | |
| 4,374,237 A | 2/1983 | Berger et al. | |
| 4,385,133 A | 5/1983 | Alberino et al. | |
| 4,394,491 A | 7/1983 | Hoffman | |
| 4,496,611 A | 1/1985 | Kawakubo | |
| 4,522,975 A | 6/1985 | O'Conner et al. | |
| 4,526,811 A | 7/1985 | Jialanella | |
| 4,561,625 A | 12/1985 | Weaver | |
| 4,643,794 A | 2/1987 | Saracsan | |
| 4,672,100 A | 6/1987 | Schonbachler | |
| 4,687,533 A | 8/1987 | Rizk et al. | |
| 4,688,752 A | 8/1987 | Barteck et al. | |
| 4,697,026 A * | 9/1987 | Lee et al. ..................... 556/418 |
| 4,735,830 A | 4/1988 | Oezelli et al. | |
| 4,761,913 A | 8/1988 | Sanok et al. | |
| 4,777,191 A | 10/1988 | Komai et al. | |
| 4,780,520 A | 10/1988 | Rizk et al. | |
| 4,792,316 A | 12/1988 | Skedeleski et al. | |
| 4,816,132 A | 3/1989 | Kotani et al. | |
| 4,835,012 A | 5/1989 | Saur | |
| 4,839,122 A | 6/1989 | Weaver | |
| 4,874,805 A | 10/1989 | Mulhaupt et al. | |
| 4,910,279 A | 3/1990 | Gillis et al. | |
| 4,912,306 A | 3/1990 | Grise et al. | |
| 4,950,581 A | 8/1990 | Koike et al. | |
| 4,963,614 A | 10/1990 | Ito et al. | |
| 4,970,244 A | 11/1990 | Komai et al. | |
| 4,999,136 A | 3/1991 | Su et al. | |
| 5,010,202 A | 4/1991 | Greco | |
| 5,063,269 A | 11/1991 | Hung | |
| 5,071,692 A | 12/1991 | Jourdaine | |
| 5,082,736 A | 1/1992 | Bravet et al. | |
| 5,114,989 A | 5/1992 | Elwell et al. | |
| 5,128,423 A | 7/1992 | Parrinello | |
| 5,139,307 A | 8/1992 | Koops et al. | |
| 5,167,899 A | 12/1992 | Jezic | |
| 5,260,350 A | 11/1993 | Wright | |
| 5,279,882 A | 1/1994 | Daude et al. | |
| 5,368,943 A | 11/1994 | Baghdachi et al. | |
| 5,378,746 A | 1/1995 | Beyrle et al. | |

(Continued)

FOREIGN PATENT DOCUMENTS

| | | |
|---|---|---|
| CN | 1112594 A | 11/1995 |
| EP | 0126541 | 1/1987 |
| EP | 106628 B1 | 7/1987 |
| EP | 377444 A3 | 2/1990 |
| EP | 414375 A | 2/1993 |
| EP | 592138 A | 4/1994 |
| EP | 0666290 A | 8/1995 |
| EP | 666290 | 9/1995 |
| EP | 0687713 A | 12/1995 |
| EP | 687713 | 10/1997 |

(Continued)

OTHER PUBLICATIONS

Copending Application U.S. Appl. No. 12/033,420 (U.S. Appl. No 60/913,700), filed Apr. 24, 2007.
Copending U.S. Appl. No. 12/035,770 (U.S. Appl. No. 60/949,369), filed Dec. 18, 2007.
Copending U.S. Appl. No. 11/959,208 (U.S. Appl. No. 60/870,639), filed Dec. 18, 2007.

(Continued)

*Primary Examiner* — Robert S Walters, Jr.
(74) *Attorney, Agent, or Firm* — The Dobrusin Law Firm, P.C.

(57) ABSTRACT

An additive (and methods for a coating composition that includes at least one an agent for improving the performance of the coating composition, selected from a Michael addition product of siloxane further containing one or more active hydrogen containing functional moieties with two or more acrylate groups; a high molecular weight adduct having multiple alkoxysilane moieties; a compound including at least one terminal unsaturation and multiple alkoxysilyl groups; an organometallic compound that includes an element selected from silicon, titanium, zirconium, aluminum, or any combination thereof.

13 Claims, No Drawings

(56) References Cited

U.S. PATENT DOCUMENTS

| | | | |
|---|---|---|---|
| 5,391,588 A | 2/1995 | Sakamoto | |
| 5,413,748 A | 5/1995 | Garza | |
| 5,466,727 A | 11/1995 | Hsieh | |
| 5,502,145 A | 3/1996 | Szum | |
| 5,554,217 A | 9/1996 | Bäbler | |
| 5,567,530 A | 10/1996 | Drujon et al. | |
| 5,603,798 A | 2/1997 | Bhat | |
| 5,623,044 A | 4/1997 | Chiao | |
| 5,637,363 A | 6/1997 | Leray et al. | |
| 5,664,041 A | 9/1997 | Szum | |
| 5,716,571 A | 2/1998 | LeLievre | |
| 5,795,501 A | 8/1998 | Kano | |
| 5,804,515 A | 9/1998 | Park | |
| 5,807,515 A | 9/1998 | Fisher et al. | |
| 5,840,428 A * | 11/1998 | Blizzard et al. | 428/412 |
| 5,852,137 A | 12/1998 | Hsieh et al. | |
| 5,864,996 A | 2/1999 | Velman et al. | |
| 5,915,780 A | 6/1999 | Kobrehel et al. | |
| 5,922,809 A | 7/1999 | Bhat et al. | |
| 5,948,927 A * | 9/1999 | Gunther et al. | 556/419 |
| 5,976,305 A | 11/1999 | Bhat et al. | |
| 6,008,305 A | 12/1999 | Wang | |
| 6,048,579 A | 4/2000 | Wang et al. | |
| 6,080,817 A | 6/2000 | Thieben et al. | |
| 6,126,737 A | 10/2000 | Mason | |
| 6,133,398 A | 10/2000 | Bhat | |
| 6,134,851 A | 10/2000 | Roze et al. | |
| 6,150,431 A | 11/2000 | Miller et al. | |
| 6,150,756 A | 11/2000 | Wakelkamp et al. | |
| 6,153,662 A | 11/2000 | Miller et al. | |
| 6,174,606 B1 | 1/2001 | Brusic et al. | |
| 6,228,433 B1 | 5/2001 | Witt | |
| 6,255,127 B1 | 7/2001 | Fujino et al. | |
| 6,290,881 B1 | 9/2001 | Krohn | |
| 6,302,681 B1 | 10/2001 | Douche et al. | |
| 6,306,924 B2 | 10/2001 | Szum | |
| 6,355,127 B1 | 3/2002 | Mahdi et al. | |
| 6,395,856 B1 | 5/2002 | Petty et al. | |
| 6,438,306 B1 | 8/2002 | Bishop | |
| 6,467,232 B1 | 10/2002 | Mackey | |
| 6,500,877 B1 | 12/2002 | Krohn | |
| 6,512,033 B1 | 1/2003 | Wu | |
| 6,592,998 B2 | 7/2003 | Anderson et al. | |
| 6,592,999 B1 | 7/2003 | Anderson et al. | |
| 6,596,445 B1 | 7/2003 | Matsumoto et al. | |
| 6,598,426 B2 | 7/2003 | Vandal et al. | |
| 6,623,791 B2 | 9/2003 | Sadvary et al. | |
| 6,649,016 B2 | 11/2003 | Wu et al. | |
| 6,653,394 B1 | 11/2003 | Meisenburg et al. | |
| 6,675,541 B2 | 1/2004 | Mackey | |
| 6,713,000 B2 | 3/2004 | Krohn | |
| 6,747,602 B2 | 6/2004 | Matsuoka et al. | |
| 6,784,223 B2 | 8/2004 | Krohn | |
| 6,797,746 B2 | 9/2004 | Cavazos-Gutierrez | |
| 6,803,001 B2 | 10/2004 | Ito et al. | |
| 6,875,470 B2 | 4/2005 | Trabesinger et al. | |
| 6,946,628 B2 | 9/2005 | Shirlin et al. | |
| 6,974,500 B2 | 12/2005 | Miyata et al. | |
| 6,984,287 B2 | 1/2006 | Zhang | |
| 7,024,822 B2 | 4/2006 | Scheer et al. | |
| 7,087,127 B2 | 8/2006 | Mahdi et al. | |
| 7,119,129 B2 | 10/2006 | Krohn | |
| 7,123,202 B2 | 10/2006 | Maeuser et al. | |
| 7,129,444 B2 | 10/2006 | Weiss | |
| 7,138,347 B2 | 11/2006 | Konno | |
| 2001/0041782 A1 | 11/2001 | Okuhira et al. | |
| 2002/0086914 A1 | 7/2002 | Lee et al. | |
| 2003/0084955 A1 | 5/2003 | Zhang | |
| 2003/0100676 A1 | 5/2003 | Okuhira et al. | |
| 2003/0105230 A1 * | 6/2003 | Hellmann et al. | 525/131 |
| 2004/0191521 A1 | 9/2004 | Weiss et al. | |
| 2004/0239008 A1 | 12/2004 | Gottlieb et al. | |
| 2005/0045103 A1 | 3/2005 | Mikhael et al. | |
| 2005/0051536 A1 | 3/2005 | Shirlin et al. | |
| 2005/0081995 A1 * | 4/2005 | Beckley et al. | 156/325 |
| 2005/0113484 A1 | 5/2005 | Kamen | |
| 2005/0126414 A1 | 6/2005 | Weiss et al. | |
| 2005/0126683 A1 | 6/2005 | Hsieh | |
| 2005/0154076 A1 | 7/2005 | Bach | |
| 2006/0025496 A1 | 2/2006 | Gasman | |
| 2006/0191625 A1 | 8/2006 | Kapp | |
| 2006/0287408 A1 | 12/2006 | Baikerikar | |
| 2008/0268259 A1 | 10/2008 | Schmatloch | |
| 2008/0269452 A1 | 10/2008 | Schwoeppe | |

FOREIGN PATENT DOCUMENTS

| | | |
|---|---|---|
| EP | 1013726 A1 | 6/2000 |
| EP | 1153090 | 12/2000 |
| EP | 1217049 A1 | 6/2002 |
| EP | 1231241 | 8/2002 |
| EP | 12311241 A | 8/2002 |
| EP | 1153090 B | 9/2002 |
| EP | 1382625 A | 1/2004 |
| GB | 2113698 A | 8/1983 |
| GB | 2147244 | 5/1985 |
| GB | 2339571 | 11/1990 |
| GB | 2271308 | 4/1994 |
| JP | 61-287476 A | 12/1986 |
| JP | 10036481 A | 2/1998 |
| JP | 2002012635 A | 1/2002 |
| JP | 2002/309163 A | 10/2002 |
| JP | 2002/309182 A | 10/2002 |
| JP | 2003/128988 A | 5/2003 |
| JP | 2003/226731 A | 8/2003 |
| JP | 2003/336008 A | 11/2003 |
| JP | 2004168957 | 6/2004 |
| JP | 2007063551 A | 3/2007 |
| WO | 93/12935 A1 | 7/1993 |
| WO | WO95/23772 | 9/1995 |
| WO | 99/31191 A1 | 6/1999 |
| WO | 00/00530 A1 | 1/2000 |
| WO | 00/06512 A1 | 2/2000 |
| WO | 01/44381 A1 | 6/2001 |
| WO | 01/47644 A1 | 7/2001 |
| WO | WO01/51567 | 7/2001 |
| WO | 03/011583 A1 | 2/2003 |
| WO | 03/011986 A1 | 2/2003 |
| WO | 03/011992 A2 | 2/2003 |
| WO | 03/062310 A1 | 7/2003 |
| WO | 03/106579 A1 | 12/2003 |
| WO | 2005/003048 A1 | 1/2005 |
| WO | 2005/040055 A1 | 5/2005 |
| WO | 2005/052071 A1 | 6/2005 |
| WO | 2006/042305 A1 | 4/2006 |
| WO | 2006/093671 A2 | 9/2006 |
| WO | 2007/002328 A | 1/2007 |
| WO | 2008/036721 | 3/2008 |
| WO | 2008/036721 A | 3/2008 |

OTHER PUBLICATIONS

Copending U.S. Appl. No. 11/958,983 (U.S. Appl. No. 60/870,643), filed Dec. 18, 2007.

Copending U.S. Appl. No. 12/041,915 (U.S. Appl. No. 60/913,703), filed Mar. 4, 2008.

Copending U.S. Appl. No. 12/033,447 (U.S. Appl. No. 60/913,706), filed Feb. 19, 2008.

Copending U.S. Appl. No. 61/014,547, filed Dec. 18, 2007, by Baikerikar et al., "Protective Coating for Window Glass Having Enhanced Adhesion to Glass Bonding Adhesives."

Copending U.S. Appl. No. 11/472,119, filed Jun. 20, 2006 (priority to U.S. Appl. No. 60/692,318, filed Jun. 20, 2005), published as 2006-0287408.

International search report, International application No. PCT/US2007/087949, Dated Apr. 24, 2008.

Office action for Chinese Patent Application No. 200780046980.7 dated Nov. 4, 2013.

* cited by examiner

ADHESION PROMOTION ADDITIVES AND METHODS FOR IMPROVING COATING COMPOSITIONS

CLAIM OF PRIORITY

The present application claims the benefit of the filing date of Provisional Application No. 60/870,641 (filed Dec. 19, 2006), the contents of which are hereby incorporated by reference in their entirety.

FIELD OF THE INVENTION

This invention relates to coating composition adhesion promotion additives, and particularly to adhesion promotion additives for use in compositions applied to transparent panel substrates, such as for window applications.

BACKGROUND OF THE INVENTION

In the field of automotive window applications, there are a number of applications requiring a strong and durable bond to a transparent substrate. Among them are blackout applications, substrate marking and/or patterning applications, bonding applications, as well as others. Various approaches have been examined for these purposes, as is exemplified in the patent literature, e.g., PCT Application Nos. WO2005/003048A1; WO2005/040055A1; WO2005/052071A1; WO2003/062310A1; WO1993/012935A1; WO2003/106579A1; WO1999/0311191A1; WO2006/093671A2; Published U.S. Application No. 20060025496A1; Published U.S. Application No. 20060191625A1; Published U.S. Application No. 20050045103A1; JP 61-287476A; EP 1013726A1; EP 377444A3; EP 106628B1; and U.S. Pat. Nos. 6,598,426; 6,500,877; 6,126,737; 5,368,943; and 4,963,614, all of which are hereby incorporated by reference.

It would be attractive to have an adhesion promotion additive that can be incorporated into commercially available coating compositions (e.g., paints, inks, adhesives, primers or otherwise), in addition to or as a substitute for one or more ingredients, for improving one or more properties of the composition, such as the adhesion strength, abrasion resistance, or water resistance. It would also be attractive to employ an adhesion promotion additive in addition to or as a substitute for one or more ingredients of a two-component (e.g., a coating composition and a separate adhesion promoter, as is common with many printing compositions) coating composition for enabling the composition to be a one-component coating composition instead.

SUMMARY OF THE INVENTION

The invention generally relates to an adhesion promotion additive for improving the characteristics of a coating composition.

In one particular aspect, the invention is directed to a coating composition (and particularly a printing ink composition) that includes at least one resin selected from an epoxy, an acrylic, a polyurethane, polyacrylate, or any combination thereof, a colorant, an adhesion promotion additive, such as one including at least one terminal unsaturation and one or more silylated groups; and a compound including an acid moiety, such as from a carboxylic acid, a phosphonic acid, a sulfonic acid, a mercapto acid or a combination thereof. Desirably the composition is one that is cured by a free radical reaction, such as one initiated by heat, radiation, or a combination of heat and radiation. The invention also contemplates admixing the aforenoted ingredients, applying the resulting admixture to a substrate (e.g., a glass substrate, plastic), and curing the admixture on the substrate.

In another aspect, the invention is directed to an additive that includes at least one agent for improving the performance of the coating composition, selected from a Michael addition product of siloxane further containing one or more active hydrogen containing functional moieties with two or more acrylate groups; one including at least one terminal unsaturation and one or more silylated groups, a high molecular weight adduct having multiple alkoxysilane moieties; an organometallic compound that includes an element selected from silicon, titanium, zirconium, aluminum, or any combination thereof.

In one specific aspect, the adhesion promotion additive includes an acrylated amino silane adduct. The methods and articles herein contemplate that the adhesion promotion additive, and possibly even the resulting coating compositions may include a pigment or dye. Other variations of the above are contemplated as well, as will be appreciated from a review of the following detailed description. It will be seen that the present invention has the potential to afford various benefits, including one or more of the avoidance of high temperature firing steps (e.g., the present invention avoids the need to subject the coating or substrate to a firing step in excess of about 600° C., more specifically in excess of about 400° C., and still more specifically in excess of about 250° C., or another temperature that would degrade the material such as by decomposition, melting or otherwise), a potential reduction in steps by avoiding the need to mix composition components immediately before contacting with the substrate, the avoidance of special high temperature handling steps for additional ceramic coatings applied to the substrate, the ability to thermally deform plastic substrates after the application of the coating composition, or any combination thereof. Resulting articles are capable of exhibiting excellent long-term performance, in one or more particular respects, such as one or more of bond strength, weatherability (e.g., including water resistance), abrasion resistance or any combination thereof.

DETAILED DESCRIPTION

As used herein, all parts by weight are based on 100 parts by weight of the recited material or composition. In a case of the coating composition, this means the weights are based on 100 parts by weight of the overall coating composition. It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1.

The present invention is directed generally to an adhesion promotion additive composition for incorporation into a base composition for realizing a coating composition. The coating compositions herein may be packaged as a one component composition or a multi-component composition (e.g., a two component composition such as one including a resin binder that is cross-linked with an adhesion promoter) and, in one particular aspect, the composition includes a curable resin as part of a base composition into which the adhesion promotion additive is incorporated. For example, the resin may be cured (e.g., cross-linked) by one or more free radical reactions, such as a reaction initiated chemically, by radiation (e.g., by exposure to actinic radiation such as ultraviolet light) or both. Optionally, or as an alternative, the resin may also be cured via electron beam exposure.

The adhesion promotion additives herein have use in any of a number of coating compositions. By way of example, some preferred applications include admixing the adhesion promotion additives herein with a base composition, such as a screen-printing ink, more specifically an ultraviolet cured screen printing ink, and even still more specifically, an ultraviolet cured screen printing ink (e.g., a one-component ink) suitable for coating a transparent substrate, such as a glass, plastic or combination thereof. Of course, other applications are also possible, including but not limited to paints, pastes, primers, adhesives, or any combination thereof, for one or more types of substrates (e.g., glass, plastic, or any other solid). In addition to automotive applications, the invention may be employed in other applications, such as packaging (e.g., bottles or other containers), labels, architectural windows, or otherwise.

Though not necessary, the coating composition may be in the form of a dispersion of a resin in one or more solvents, wherein any such solvents may be evaporated as part of a process for achieving curing of the composition. For example the compositions may be water-based, organic based or otherwise. In one aspect, the compositions desirably will be generally non-toxic. The coating composition may be in the form of a paste, a liquid or even a solid (e.g., a film or powder). The one or more solvents may comprise water or a volatile organic solvent that does not become incorporated in the coating. More preferably the solvent is water or an organic solvent comprising glycol ethers, ketones, alcohols, acetates, toluene or xylene.

For many applications, the coating compositions will generally include art-disclosed ingredients customarily employed in coating compositions, such as one or more of a pigment and/or dye, a filler, a light stabilizer, a hardener, a surfactant, a dispersant, a de-foaming agent, a slip additive, a leveling agent, a thinner, a thickener or thixotrope, a flexibilizer, an adhesion promoter, a plasticizer, a photoinitiator, a catalyst or any combination thereof. Pigments may be organic, inorganic or a combination thereof. Particles comprising the pigment could have an average particle size of from 0.01 to 25 microns. Various examples of pigments are disclosed in the patents cited herein, and include for example the pigments of U.S. Pat. No. 5,554,217, incorporated by reference. One or more suitable waxes may be employed.

If employed, examples of fillers may include, without limitation, alumina (e.g., alpha alumina), silica (e.g., fumed or fused silica), mica, kaolin, talc, barium sulfate, carbides, potassium sulfate, calcium carbonate, zinc oxide, silicates, clay, titanium dioxide, zirconia, boron carbide, silicon carbide, cerium oxide, glass, wollastonite, diamond, aluminum nitride, silicon nitride, yttrium oxide, titanium diboride, metallic salts of fatty acids, or any combination thereof. Other fillers may be employed, such as those taught in U.S. Pat. No. 7,781,493 B2, by Baikerikar et al. (incorporated by reference). Preferred fillers may contain surface hydroxyls, have a particle size of about 10 microns or less and most preferably 5 microns or less, or both. When employed, filler may be present in a sufficient amount to enhance the surface hardness and abrasion resistance and in an amount such that a homogeneous dispersion can be prepared. For example, filler may be present in as little as about 5 parts by weight, to about 60 parts by weight of the coating, or as otherwise disclosed in U.S. Pat. No. 7,781,493B2 by Baikerikar et al. (incorporated by reference).

In a particular aspect of the invention, the ingredients are selected so as to permit the resin of the composition to cross-link, and possibly even to cross-link for forming an interpenetrating network. For example, cross-linking may include cross linking of the resin of the coating composition with any adhesion promoter already present in the composition or system, the adhesion promotion additive compositions herein or a combination of both. For multi-component composition systems, the ingredients may be present in any or all of the components of the system. For example, a resin may be present in one component, with an adhesion promoter present in another.

The base composition of the coating compositions (with which the adhesion promotion additives herein are mixed) generally will include art-disclosed resins, such as those disclosed (without limitation) in U.S. Pat. No. 5,554,217, incorporated by reference, and thus may include one or more of a polymeric material from the group consisting of polyacrylates, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, (meth)acrylic polymers, rubber, silicone polymers, phenol/formaldehyde resins, melamine/formaldehyde resins, urea/formaldehyde resins, epoxy resins, diene rubbers and any combination thereof (such as copolymers, blends or otherwise). Desirably, the resin is selected from one or more resins selected from an epoxy, a (meth)acrylic, a polyurethane, a polyacrylate, or any combination thereof.

Examples of commercially available base compositions with which the adhesion promotion additives herein may be admixed include, without limitation, ultraviolet curable screen printing compositions offered by Nazdar (e.g., under the POWERPRINT® Plus 1800 series), by Marabu (e.g., under the designation ULTRAGLASS UVGO), or Ruco (under the 9XX UV ink series, e.g., 935 UV). Other examples of suitable compositions include those disclosed in PCT Application Nos. WO2005/003048A1; WO2005/040055A1; WO2005/052071A1; WO2003/062310A1; WO1993/012935A1; WO2003/106579A1; WO1999/0311191A1; WO2006/093671A2; Published U.S. Application No. 20060025496A1; Published U.S. Application No. 20060191625A1; Published U.S. Application No. 20050045103A1; JP 61-287476A; EP 1013726A1; EP 377444A3; EP 10662881; and U.S. Pat. Nos. 6,797,746; 6,598,426; 6,500,877; 6,126,737; 5,368,943; and 4,963,614, all of which are hereby incorporated by reference.

One particular approach contemplates the incorporation of the adhesion promotion additives herein to a black coating composition. However, the incorporation into a coating composition of some other color is also contemplated. The adhesion promotion additives herein may be added to one of the above compositions, used in lieu of an ingredient or component of the compositions or both. Additionally the adhesion promotion additive may be used to tune the performance of one of the base compositions, such as by varying the concentrations of one or more of the ingredients from its existing level to another level.

In general, methods herein contemplate providing an adhesion promotion additive composition and admixing the adhesion promotion additive composition with a base composition (or one or more ingredients thereof), optionally in the presence of heat, for realizing a resulting coating composition. The resulting coating composition optionally may be packaged as a one-component composition, or the adhesion promotion additive may be packaged separately for mixing with a base composition at a remote location (e.g., at the point of application to a substrate). The resulting coating composition is contacted with a substrate and cured, such as by exposure to chemical, moisture, heat, air, radiation, or any combination thereof. For achieving a durable cure, the resulting coating composition may be subjected to one or more secondary curing steps (e.g., exposure to chemical, moisture, air, heat, radiation, or any combination thereof). For example, in some embodiments it is contemplated that the compositions will be cured by ultraviolet radiation and, simultaneously or thereafter, by heat (e.g., above about 100° C. from about 120 to about 170° C., and more specifically about 140 to about 160° C.). Optionally, or as an alternative, the compositions may also be cured with electron beam irradiation.

When applied to a substrate the resulting coating composition may have any suitable surface finish, and thus could include one or more ingredients for achieving a pearlescent finish, a metallic finish, a mat finish, a gloss finish, a semi-gloss finish, a multi-chromatic finish, a texture, or any combination thereof.

The substrates herein, in one particular aspect, may be transparent (i.e., optically transparent) over at least a portion of its volume. For example, because the invention herein is particularly useful for coating at least a portion of a window or other panel (e.g., an automotive windshield, backlight, sidelight, light lens, mirror, sun roof, gauge lens, or the like), typically, the substrates will be panels that are transparent through at least one surface, and particularly through both opposing surfaces, over at least about 25% of the area of the surface, and more specifically, at least a majority (e.g., at least about 60%, 75% or even 90% of the area of the surface). The substrates herein thus may be made from a substantially amorphous material, and particularly an amorphous ceramic (such as glass), a plastic, or a combination thereof. Without limitation, examples of suitable substrate materials include poly(meth)acrylates, polycarbonates, vinyls, polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Illustrative materials are also described at cols. 11-12 of U.S. Pat. No. 7,129,444 (incorporated by reference).

The substrates herein typically will include at least one surface onto which the resulting coating composition is applied. The surface may optionally be treated for improving the bond strength of the coating to the substrate, e.g. by a primer, a flame spray, a corona treatment, a plasma treatment, or some other surface treatment. However, in one specific example, the outer surface is substantially free of any surface treatment. Accordingly, upon application, the coating composition is in direct intimate contact with the substrate, and particularly in the substantial absence any intermediate layer. Of course, after applying the composition to the substrate it is also possible to apply over some or all of one or both of the composition and substrate a further layer (e.g., a silicone, an acrylic, a polyurethane, or otherwise, for realizing a protective over-layer), such as is disclosed in columns 12-14 of U.S. Pat. No. 7,129,444 (incorporated by reference). It is also possible that the coating composition herein may be employed over, beneath and/or adjacent a frit (e.g., a frit of the type taught in U.S. Pat. No. 7,781,493 by Baikerikar et al. (incorporated by reference)).

When applied, the coating composition herein generally will have a thickness of up to about 250 microns or higher. More commonly it will be less than about 150 microns, less than about 100 microns or even less than about 50 microns (e.g., about 10 to about 30 microns or smaller).

Though some applications may call for the coating of substantially an entire surface of a substrate with the coating composition herein, ordinarily the coating compositions will be applied to the substrates selectively, according to a predetermined pattern (e.g., substantially along an edge portion of the substrate, about the periphery of the substrate, or otherwise). For example, one approach is to apply the coating from the edge of the substrate inwards toward the central portion in a width of about 2, 5, 8, or even 12 cm or greater. It is also possible that the coating composition may be applied for defining one or more lines, curves, dots, or other geometric configurations comprising segments of constant or varying width height, length or other dimension. For example, the coating composition can be applied to have a frit pattern.

For a particular aspect of the invention, the coating composition is one that is capable of being applied to a substrate as a liquid, a paste, a solid (e.g., as a powder or film) or a combination thereof. Thereafter, it hardens, and also bonds to the substrate, while affording a generally abrasion resistant, thermally stable, and light stable composition such that it may be advantageously employed in environments common for automotive applications.

As indicated, the resulting coating compositions herein preferably will include a particular adhesion promotion additive, and particularly the adhesion promoter as described in U.S. Pat. No. 7,781,493 by Baikerikar et al. (incorporated by reference). In a specific embodiment, though not required for all applications, the adhesion promotion additives will enhance the bonding of the composition to glass, coated plastic and/or an isocyanate or siloxy functional adhesive.

In general, the adhesion promotion additive will include a material having at least one group capable of reacting, binding and/or associating with a group on at least one surface of the substrates to be bonded together. In one non-limiting embodiment, the adhesion promotion additive can help serve as a molecular bridge at the interface of at least two surfaces wherein the surfaces can be similar or dissimilar surfaces.

The adhesion promotion additive may be synthesized by any of a number of reactions. Thus, the adhesion promotion additive may be prepared by a reaction of a first compound including at least one terminal unsaturation (e.g., an acrylate) and a second compound including one or more silylated groups (e.g., multiple alkoxysilyl groups). By way of example, the adhesion promotion additive may be the reaction product of a first compound including silicon and a moiety selected from at least one of a mercapto group, an amino group, an epoxy group, a hydroxyl group, a sulfoethyl group, an isocyanate group, a (meth)acrylate group, or any combination thereof, with a second compound including a moiety selected from at least one of an isocyanate group, a hydroxyl group, a carboxyl group, a mercapto group, an epoxy group, an acetoacetoxy group, a (meth)acrylate group, and amino group, or any combination thereof. By way of more specific examples, one or more of the following synthesis reactions may be suitably employed for preparing the adhesion promotion additive:

a. mercapto silane+isocyanate functional acrylate or methacrylate (e.g., so as to include a reaction between —SH and —NCO)

b. amino silane+isocyanate functional acrylate or methacrylate (e.g., so as to include a reaction between —NH or —NH2 with —NCO)

c. isocyanate silane+hydroxyl functional acrylate or methacrylate (e.g., so as to include a reaction between —NCO and —OH)

d. epoxy silane+amine functional acrylate or methacrylate (e.g., so as to include a reaction between epoxy and amine)

e. epoxy silane+carboxylic acid functional acrylate or methacrylate (e.g., so as to include a reaction between epoxy and —COOH)

f. mercapto acid+isocyanate functional acrylate or methacrylate (e.g., so as to include a reaction between —NCO with either/both —SH or —COOH)

g. Michael addition of amino silane+carboxylic acid functional acrylate or methacrylate (e.g., so as to include a reaction between the terminal double bond and amine; thus the product would contain both alkoxysilyl and —COOH functionality with a terminal acrylate in the same molecule);

h. amino silane+epoxy functional (meth)acrylate or methacrylate, such as glycidyl methacrylate (e.g., so as to include a reaction between epoxy and amine)

i. isocyanate silane+amine acrylate or methacrylate (e.g., so as to include a reaction between —NH or —NH2 with —NCO)

j. 2-sulfoethyl acrylate or methacrylate+isocyanate silane (e.g., so as to include a reaction between —SO2OH+—NCO)

k. hydroxy silane+isocyanate functional acrylate or methacrylate (e.g., so as to include a reaction between —NCO and —OH)

l. mercapto silane+epoxy functional (meth)acrylate such as glycidyl methacrylate (e.g., so as to include a reaction between —SH with epoxy)

m. epoxy silane+hydroxyl functional (meth)acrylate (e.g., so as to include a reaction between epoxy and —OH)

n. hydroxy silane+epoxy functional (meth)acrylate (e.g., so as to include a reaction between —OH with epoxy)

o. isocyanate silane+acetoacetoxy functional (meth)acrylate (e.g. so as to include a reaction between —NCO and active methylene group of acetoacetoxy functionality)

p. amino silane+acetoacetoxy functional (meth)acrylate (e.g. so as to include a reaction between amine and carbonyl group of acetoacetoxy functionality)

q. meth(acrylate) silane+acetoacetoxy functional (meth)acrylate (e.g. so as to include a Michael reaction between unsaturation from silane with active methylene group of acetoacetoxy functionality);

r. hydroxyl silane+carboxylic acid functional (meth)acrylate (e.g. so as to include a reaction between hydroxyl and carboxylic acid).

s. amino silane+polyacrylates (e.g. so as to include a Michael reaction between amine and acrylate); or t. amino silane+acryloyl or methacryloyl chloride (e.g. so as to include a reaction between an amine and chlorine to form an amide);

u. amino silane+carboxylic acid functional (meth)acrylate (e.g. so as to include a reaction between an amine and carboxylic acid to form an amide); or v. any combination of the foregoing.

The adhesion promotion additive, in another non-limiting embodiment, can include one or more monomers, oligomers and/or polymers. Such materials include, but are not limited to, organometallics such as silanes, titanates, zirconates, aluminates, metal containing compounds, zirconium aluminates, hydrolysates thereof and mixtures thereof. Preferably, such adhesion promoter contains titanium or silicon and most preferably contains siloxy (silicone and oxygen) linkages. Preferably, the silicon-containing adhesion promotion additive includes a polysiloxane such as those disclosed in U.S. Pat. No. 5,502,045 at column 2, lines 8-20 and at column 3, lines 3-54, incorporated herein by reference; tetraorthosilicates as disclosed in U.S. Pat. No. 6,306,924 at column 2, lines 26-39 and column 3, lines 24-42, relevant parts incorporated herein by reference; and multifunctional silanes such as those disclosed in Mandi et al., U.S. Pat. No. 6,355,127 at column 21, lines 44 to column 22, line 38, relevant parts incorporated herein by reference or reaction products of these silanes and other intermediates. Non-limiting examples of silane coupling agents include: vinyltriacetoxysilane, vinyltrimethoxysilane, vinyltriethoxysilane, vinyltri(2-methoxyethoxy) silane, vinyltriphenoxysilane, vinyltriisopropoxysilane, vinyltri-t-butoxysilane, divinyldiethoxysilane, γ-glycidoxypropyltrimethoxysilane, allyltriethoxysilane, allyltrimethoxysilane, (3-acryloxypropyl)dimethylmethoxysilane, (3-acryloxypropyl)-methyldimethoxysilane, (3-acryloxypropyl)trimethoxysilane, (methacryloxy-methyl) dimethylethoxysilane, methacryloxymethyltriethoxysilane, methacryl-oxymethyltrimethoxysilane, methacryloxypropyldimethylethoxysilane, methacryl-oxypropyltrimethoxysilane, styrlethyltrimethoxysilane, mercaptomethyl-methyldiethoxysilane, 3-mercaptopropylmethyldimethoxysilane, 3-mercaptopropyl-triethoxysilane. 3-mercaptopropyltrimethoxysilane, and amino silanes, such as aminopropyltrimethoxysilane, bis(trimethoxysilyl)propyl amine, or bis(triethoxysilyl)propyl amine; at least partial hydrolysates thereof or mixtures thereof. Titanate, zirconate or zircoaluminate materials useful as an adhesion promotion additive in this invention include those described in Wu et al., U.S. Pat. No. 6,649,016, column 7, line 23 to column 8, line 53, relevant parts incorporated herein by reference. Preferred titanium materials include those commercially available under the TYZOR name from DuPont or tetra (2,2 diallyoxymethyl) butyl, di(ditridecyl)phosphito titanate (commercially available as KR 55, from Kenrich Petrochemicals, Inc.); neopentyl (diallyl) oxy, trineodecanonyl titanate; neopentyl(diallyl) oxy, tri(dodecyl)benzene-sulfonyl titanate; neopentyl (diallyl)oxy, tri(dioctyl)phosphato titanate; neopentyl (diallyl) oxy, tri(dioctyl)pyro-phosphato titanate; neopentyl (diallyl)oxy, tri(N-ethylenediamino)ethyl titanate; neopentyl (diallyl)oxy, tri(m-amino)phenyl titanate; neopentyl(diallyl) oxy, trihydroxy caproyl titanate; isopropyldimethylacrylisosteroyl titanate; tetraisopropyl (dioctyl) phosphito titanate; at least partial hydrolysates thereof or mixtures thereof. Preferred zirconium materials include zircon aluminates. Non-limiting examples of zirconate materials include tetra (2,2 diallyloxymethyl)butyl, di(ditridecyl)phosphito zirconate (commercially available as KZ 55 from Kenrich Petrochemicals, Inc.); neopentyl(diallyl) oxy, trineodecanoyl zirconate; neopentyl(diallyl) oxy, tri (dodecyl)benzene-sulfony zirconate; neopentyl(diallyl)oxy, tri(dioctyl)phosphato zirconate; neopentyl(diallyl)oxy, tri (dioctyl)-pyrophosphato zirconate neopentyl(diallyl)oxy, tri (N-ethylenediamino)ethyl zirconate; neopentyl(diallyl)oxy, tri(m-amino)phenyl zirconate; neopentyl(diallyl)oxy, trimethacryl zirconate; neopentyl(diallyl)oxy, triacryl zirconate; dineopentyl(diallyl)oxy, diparamino benzoyl zirconate; dineopentyl(diallyl)oxy, di(3-mercapto)propionic zirconate; at least partial hydrolysates thereof or mixtures thereof. Generally, the adhesion promotion additives are present in a sufficient amount to achieve a durable bond of the coating to glass, plastic or coated plastic, and preferably to form a durable bond to the isocyanate or siloxy-functional adhesive. If too little adhesion promotion additive is used, then poor adhesion will be exhibited by the coating to the glass, plastic, coated plastic and/or adhesive. If too much adhesion promoter is utilized, the coating composition may be unstable. In this context "unstable" means that the composition may cure before being exposed to the desired curing conditions. By way of example, without limitation, the adhesion promotion additive herein are preferably present in an amount of about 1 part by weight or greater based on the weight of the composition, more preferably about 6 parts by weight or greater and most preferably about 8 parts by weight or greater and preferably about 10 parts by weight or greater. Preferably, the adhesion promoter is present in an amount of about 30 parts by weight or less based on the weight of the composition and more preferably about 20 parts by weight or less.

In a preferred embodiment, the composition comprises either one or both of two silane adhesion promotion additives, one selected from the group of polysiloxanes and tetraorthosilicates and a second selected from a group of multifunctional silanes.

Preferred tetraalkylorthosilicates are described by the following formula:

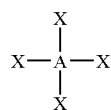

wherein A is Si, and where X is separately in each occurrence hydrolyzable groups that can be hydrolyzed from the tetra-substituted compound in the presence of water. Examples of hydrolyzable groups include, but are not limited to, halogen (e.g., chlorine, fluorine and bromine), formyloxy, acetoxy, propionyloxy, valeryloxy, stearoyloxy, benzoyloxy, naphthoyloxy, toluyloxy, maleoyloxy, alkoxy, alkylthio, vinyloxy, allyloxy, vinyletheroxy, methacryloxy and acryloxy. These and other groups herein are defined according to the IUPAC Nomenclature Rules (1969). Preferably, the hydrolyzable groups X are independently an alkoxy group or a group containing ethylenic unsaturation. Preferably, the alkoxy group is a $C_1$-$C_5$ alkoxy. Upon hydrolysis, the $C_1$-$C_6$ alkoxy groups form volatile alcohols, which can escape from the coating composition by evaporation. Examples of such $C_1$-$C_6$ alkoxy groups include, but are not limited to, methoxy, ethoxy, isopropoxy, n-butoxy, sec-butoxy, isobutoxy and tert-butoxy. Most preferably, the alkoxy groups are methoxy and ethoxy. When the hydrolyzable group contains ethylenic unsaturation, the ethylenic unsaturation may react with other ethylenically unsaturated compounds in the coating composition. Such hydrolyzable groups containing ethylenic unsaturation include, but are not limited to, vinyloxy, allyloxy, vinyletheroxy. methacryloxy and acryloxy. It is contemplated that X may be the same or different in each instance. Preferably, the tetrasubstituted compound is a liquid so that it may be easily added to a coating composition. Alternatively, the tetrasubstituted compound may be a solid that is soluble in the coating composition. The compositions of the present invention may contain one tetrasubstituted compound or it may contain a mixture of tetrasubstituted compounds. Tetramethoxy silane and tetraethoxy silane may be purchased as tetramethyl orthosilicate and tetraethyl orthosilicate respectively, from the Aldrich Chemical Company of Milwaukee, Wis. or from Silbond Corporation under the trademark SIL-BOND. Preferred tetraalkylorthosilicates are described by the following formula:

The preferred polysiloxanes useful in the invention are preferably illustrated by the following formula:

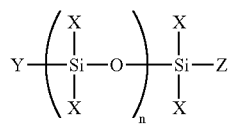

wherein Y and Z are independently selected from the group consisting of halogen, amino, alkyl and alkoxy; n is one or more; and each X is as defined hereinbefore. As used herein the term "alkyl" shall mean a monovalent straight chain or branched chain group of carbon atoms including, but not limited to, methyl, ethyl, n-propyl, isopropyl, n-butyl, sec-butyl, isobutyl, tertbutyl and the like. As used herein the term "alkoxy" shall mean an alkyl group attached to the remainder of the molecule through an oxygen atom including, but not limited to, methoxy, ethoxy, isopropoxy, n-butoxy, sec-butoxy, isobutoxy, tert-butoxy and the like. Preferably, the alkyl portions of the alkoxy groups are lower alkyl groups. As used herein, the term "lower alkyl group" shall mean an alkyl group, branched or unbranched, cyclic or acyclic, having from 1 to 10 carbon atoms inclusive. Some examples of lower alkyl groups include, but are not limited to, methyl, ethyl, propyl, isopropyl, butyl, pentyl and cyclohexyl. Most preferably, each alkyl group is methyl or ethyl. As used herein the term "lower alkoxy group" shall mean an alkyl group attached to the remainder of the molecule through an oxygen atom, where the alkyl group is a lower alkyl group.

It is contemplated that the siloxane main chain may be linear or branched. A branched structure results when some Xs are alkoxy groups and some Xs are siloxane groups. It is also contemplated that each alkoxy group may be the same or different. Preferably, the poly(siloxane) is a liquid so that it may be easily added to a polymeric coating composition. Alternatively, the poly(siloxane) may be a solid that is soluble in the polymeric coating composition. The compositions of the present invention may contain one poly(siloxane) or it may contain a mixture of poly(siloxanes).

Multifunctional silanes comprise compounds which have a silane functionality and a second functional group including epoxy, amino, vinyl, isocyanate, isocyanurate, mercapto, acrylate, methacrylate, hydroxyl, allyl, groups and the like. Preferred adhesion promoters for adhesion to coated surfaces, such as those coated with a clear coat or a pigmented coating, include the amino alkoxy silanes, (meth)acrylate alkoxy silanes, hydroxyl alkoxy silanes, allyl alkoxy silanes, vinyl alkoxy silanes, isocyanato alkoxy silanes, epoxyalkoxy silanes, mercapto alkoxy silanes and isocyanurate functional alkoxy silanes for instance. More preferred multifunctional silanes include gamma-glycidoxy-propyltrimethoxy silane, gamma-aminopropyltrimethoxy silane, gamma-isocyanato-propyltrimethoxy silane, n-beta-(aminoethyl)gamma-aminopropyl-trimethoxy silane, n-(2-aminoethyl)-3-aminopropyl-methyldimethoxy silane, 3-aminopropylmethyl-dimethoxy silane, 3-aminopropylmethyldimethoxy silane, bis-(gamma-trimethoxysilyl-propylamine). bis(triethoxysilyl)propyl amine, n-phenyl-gamma-aminopropyl-trimethoxysilane, gamma-isocyanatopropyl-methyldimethoxy silane, gamma-isocyanatopropyltriethoxy silane, beta (3,4-epoxy-cyclohexyl)ethyl-triethoxysilane, gamma-glycidoxypropylmethyldimethoxy silane, tris(gamma-trimethoxysilylpropyl) isocyanurate, 3-acryloxypropyltrimethoxysilane, 3-methacryloxypropyltrimethoxysilane, vinyltriethoxysilane, or vinyltrimethoxysilane.

In another preferred embodiment, the adhesion promotion additive is the Michael addition product of siloxane further containing one or more active hydrogen containing functional moieties with two or more acrylate groups. The reaction product preferably has three or greater siloxy groups and more preferably 6 or greater. The reaction product preferably contains no active hydrogen atoms. The reaction product also preferably has at least one unsaturated group capable of reacting in the presence of free radicals. Preferably, the acrylate containing reactant is an alkoxylated polyol derived di or polyacrylate such as propoxylated neopentyl glycol diacrylate, propoxylated glyceryl triacrylate, or other polyacrylates such as hexanediol diacrylate, tripropylene glycol diacrylate, dipropylene glycol diacrylate, cyclohexanedimethanol diacrylate, alkoxylated cyclohexanedimethanol diacrylates, nonanediol diacrylate, tricyclodecane dimethanol diacrylate, cis/trans 1,3/1,4 cyclohexanedimethanol diacrylate, butanediol diacrylate, butylene glycol diacrylate, ditrimethylolpropane tetraacrylate, and the like. The Michael addition product is prepared by reacting the reactants at elevated temperatures of about 30° C. to about 60° C., preferably about 55° C. for a sufficient time such that all of the functional groups having active hydrogen atoms are reacted for instance, all amines are tertiary amines. Preferably, the reactants are reacted at elevated temperatures for greater than about 72 hours. The nature of the alkoxy groups on the Michael addition product impacts the speed of cure of the coating composition of the invention. Methoxy groups hydrolyze faster and thus the curing reaction goes faster when methoxy groups are found on the siloxy groups. When higher alkoxy groups are present the reaction is slower. The overall reaction speed, and thus working time can be adjusted by adjusting the relative amount of alkoxy groups on the adhesion promotion additive and the ratio of the methoxy groups to higher alkoxy groups present. It will be appreciated that one or more additives (e.g., a catalyst may be employed to accelerate the reaction time for synthesis of the adhesion promoter. For example, without limitation, a tertiary amine (e.g., in an amount of about 0.1 to about 3 parts by weight) may be employed in an instance when the composition uses a Michael addition product, such as 1,8 diazobicyclo[5.4.0]undec-7-Ene, (available from Aldrich under the designation DBU).

In another embodiment, the adhesion promotion additive is a high molecular weight adduct having multiple alkoxysilane moieties. Preferably, the adduct has 3 or greater alkoxysilane moieties and more preferably 6 or greater. Preferably, the adduct has a number average molecular weight of about 500 Da or greater and more preferably 1,000 Da or greater. The adduct preferably contains no reactive hydrogen containing moieties. In a preferred embodiment, the adduct is the reaction product of an epoxy silane, such as gamma propyl trimethoxy epoxy silane or gamma propyl triethoxy epoxy silane, with one or more silanes having reactive hydrogen containing moieties under conditions that an excess of epoxy equivalents is present as compared to active hydrogen containing moieties. Preferably, the equivalent ratio of epoxy moieties to active hydrogen containing moieties is about 1.1 or greater; and more preferably about 1.12. Preferably, the equivalent ratio of epoxy equivalents to active hydrogen containing moieties is about 1.14 or less. The preferred active hydrogen containing moieties are amine and mercapto with amine being most preferred. The epoxy silane active hydrogen containing silane reacted product is thereafter reacted with the reaction product of an aliphatic di- or polyisocyanate, such as tetramethylene diisocyanate (TMDI), and an active hydrogen functional moiety containing silane, for instance, an aminosilane or mercaptosilane. The two reaction products are reaction in a sufficient ratio such that the resulting adduct contains no active hydrogen atoms or isocyanate groups. The resulting adduct is added to the coating compositions in a sufficient amount to enhance the long term adhesion of the coating composition to substrates and adhesive systems. Preferably, the high molecular weight alkoxysilane containing adduct is present in an amount of about 1 part by weight or greater and more preferably about 5 parts by weight or greater. The high molecular weight alkoxysilane containing adduct is preferably present in an amount of about 15 parts by weight or less and more preferably about 10 parts by weight or less. The high molecular weight alkoxysilane adduct is preferably added to the coating composition of the invention in admixture with a reactive diluent as described hereinbefore. In a preferred embodiment, the adhesion promotion additive comprises a mixture of the Michael addition product containing alkoxysilane groups and the high molecular weight alkoxysilane adducts, preferably the two types of adducts are used in a ratio of about 1 to about 15 and more preferably about 1 to about 5.

Further adhesion promoters that contain: (i) at least one terminal unsaturation (preferably an acrylate group), and (ii) 3 to 6 alkoxysilyl groups (more alkoxysilyl groups are preferred).

The adhesion promotion additives herein further comprise or be employed in combination with a compound that includes at least one acidic moiety, as taught in U.S. Pat. No. 7,781,493 by Baikerikar et al. (incorporated by reference). Preferably, the acidic moiety has an acid group that is a strong acid group. Examples of acids include one or more of carboxylic acids, phosphoric acids, mercapto acids, sulfuric acids, sulfonic acid groups or other acids containing sulfur. Preferred acid groups are carboxylic acid groups and phosphoric acid groups, such as phosphate acids. The most preferred acid groups are carboxylic acid groups. Moreover, it is preferred that the acid contains unsaturation (such as a double bond from an acrylate, methacrylate, vinyl, or allyl group) so that it can co-react with the other acrylates present in the coating. Among preferred classes of acid-containing compounds are acidic functional acrylates or (meth)acrylates, including methacrylic acids, acrylic acids, acrylated phosphate acid esters, mono-2-(methacryloxy)ethyl maleate or phosphoric monoacrylate, maleic acids, itaconic acids, vinyl phosphonic acid, 2-sulfoethylmethacrylate, beta-carboxyethyl acrylate, 3-butenoic acid, 4-pentenoic acid, acrylamido glycolic acid, crotonic acid, tiglic acid, 2-(Trifluoromethyl) acrylic acid, dimethylacrylic acid, undecylenic acid, mixtures thereof and the like. The acid is present in a sufficient amount to enhance bonding to the glass or coated plastic and/or adhesive. The reactive acid-containing compound is present in the composition in an amount of about 1 and more preferably about 4 parts by weight or greater based on the coating composition. The reactive acid compound is preferably present in the composition in an amount of about 10, and more preferably about 8 weight parts or less of the coating. In general the adhesion promotion additive will be employed with the acid in an additive: acid weight ratio of about 1:1 to about 10:1 (e.g., about 2:1 to about 5:1, and more specifically about 3:1).

The composition may further comprise a catalyst or initiator capable of initiating cure of the film-forming resin under curing conditions. Preferably, those curing conditions are sufficient to cause formation of free radicals or cations. Preferred catalysts or initiators include photoinitiators which initiate free radical polymerization by the formation of free radicals or which generate cations, or thermal initiators which generate free radicals or which form or release cations when exposed to heat. Photoinitiator systems having a corresponding sensitivity to actinic radiation are normally incorporated into formulations containing compounds of the present invention and upon irradiation lead to the formation of reactive species capable of initiating polymerization. In one preferred embodiment, the initiator is a compound which when exposed to irradiation initiates free radical polymerization. Examples of photoinitiators include alpha aminoketones, alpha hydroxyketones, phosphine oxides, phenylglyoxalates, thioxanthones, benzophenones, benzoin ethers, oxime esters, benzil ketals, amine synergists, maleimides, mixtures thereof and the like. Preferable photoinitiators include compounds in the following categories: phosphine oxides, ketones and their derivatives, benzophenones, carbocyanines and methines, polycyclic aromatic hydrocarbons, such as anthracene or the like, and dyestuffs, such as xanthenes, safranines and acridines. More generally, these are essentially chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1, 2-propanedione 2-[0-(benzoyl)oxime]; halogenated compounds, such as halogenated ketones or aldehydes, methylaryl halides, sulfonyl halides or dihalides; phosphine oxides and photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylacetophenone, phenyl benzoin, benzophenone, substituted benzophenones, phosphine oxides and the like. It is understood by those skilled in the art that when benzophenone and similar compounds are used as photoinitiators a synergistic agent, such as a tertiary amine or polymeric amine such as a secondary or primary amine terminated polypropylene oxide) polyol are employed to enhance the conversion of photoadsorbed energy to polymerization-initiating free radicals.

The photoinitiators supply to the molecules containing unsaturation or to the initiator part of the energy transmitted by the light. By means of the unsaturated systems or of a photoinitiator, the photosensitizers produce free radicals or ions which initiate the polymerization or the cross-linking of the composition. It is also possible to use mixtures with known photoinitiators for example, mixtures with camphorquinone; benzophenone; benzophenone derivatives (e.g. 1-[4-(4-benzoyl-phenylsulfanyl)-phenyl]-2-methyl-2-(toluene-4-sulfonyl)-propan-1-one); acetophenone, acetophenone derivatives, for example, α-hydroxycycloalkyl phenyl ketones or dialkoxyacetophenones; α-hydroxy- or α-aminoacetophenones, for example, oligo-[2-hydroxy-2-methyl-1-[4-(1-methylvinyl)-phenyl]-propanone], 2-hydroxy-2-methyl-1-phenyl-propanone, 2-hydroxy-1-[4-(2-hydroxyethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-one, 2-benzyl-2-dimethylamino-1-(3,4-dimethoxy-phenyl)-butan-1-one, 2-benzyl-2-dimethylamino-1-(4-morpholin-4-yl-phenyl)-butan-1-one, 2-methyl-1-(4-methylsulfanyl-phenyl)-2-morpholin-4-yl-propan-1-one; 4-aroyl-1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxo-phenyl-acetic acid 2-[2-(2-oxo-2-phenyl-acetoxy)-ethoxy]-ethyl ester; peresters, for example, benzophenone-tetracarboxylic acid peresters, as described, for example, in EP 126 541 (U.S. Pat. No. 4,777,191 and U.S. Pat. No. 4,970,244 incorporated herein by reference); monoacylphosphine oxides, for example, (2,4,6-trimethylbenzoyl)-diphenyl-phosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl) phosphine oxide, bis(2,4,6-trimethylbenzoyl)-phenyl-phosphine oxide or bis(2,4,6-trimethylbenzoyl)-(2,4-dipentoxyphenyl)phosphine oxide, trisacyiphosphine oxides; halomethyltriazines, for example, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaaryl-bisimidazole/coinitiator systems, for example, ortho-chloro-hexaphenyl-bisimidazole together with 2-mercaptobenzthiazole; ferrocenium compounds or titanocenes, for example, dicyclopentadienyl bis(2,6-difluoro-3-pyrrolo-phenyl)titanium; borate photoinitiators or O-acyloxime photoinitiators as described, for example, in GB 2,339,571 (U.S. Pat. No. 6,596,445 incorporated herein by reference).

It is also possible to add thermal free radical initiators, for example, benzoyl peroxide (other suitable peroxides are described in U.S. Pat. No. 4,950,581, column 19, lines 17-25), incorporated herein by reference or cationic initiators, such as aromatic sulfonium, phosphonium or iodonium salts, as described, for example, in U.S. Pat. No. 4,950,581, column 18, line 60 to column 19, line 10 incorporated herein by reference. An example of an iodonium salt is (4-isobutylphenyl)-4-methylphenyl-iodonium hexafluorophosphate. Maleimide derivatives, as described, for example, in U.S. Pat. No. 6,153,662 or U.S. Pat. No. 6,150,431 both incorporated herein by reference, may also be present. Examples which may be mentioned are N-(2-trifluoromethyl-phenyl)maleimide and N-(2-tert-butylphenyl)maleimide.

Among preferred classes of photoinitiators are alpha aminoketones, benzophenones, phosphine oxides, alpha hydroxyketones, mixtures thereof and the like, with the phosphine oxides most preferred. Among preferred photoinitiators are 1-hydroxycyclohexyl-phenylketone available from Ciba Geigy under IRGACURE 184, oligomeric alpha hydroxyketones, such as ESACURE ONE or KIP 150 from Lamberti, 2-benzyl 2-N-dimethylamino-1-(4-morpholinophenyl)-1-butanone available from Ciba Geigy under IRGACURE 369 or IRGACURE 379, and phosphine oxides available from BASF under LUCIRIN TPO, LUCIRIN TPO-L, LUCIRIN TPO-XL, or IRGACURE 819, IRGACURE 2100 from Ciba, mixtures thereof, such as SARCURE™ SR 1135 from Sartomer or ESCACURE KTO 46 or TZT from Lamberti, which is a mixture of an alpha hydroxy ketone benzophenone derivatives and a phosphine oxide, and the like. Preferably, the catalyst or initiator is present in an amount of about 0.1, more preferably about 1, even more preferably about 2 and most preferably about 4 parts by weight or greater based on the weight of the coating composition. Preferably, the catalyst or initiator may be present in an amount of about 20, more preferably about 12, even more preferably about 10, and most preferably about 8 parts by weight or less based on the weight of the coating composition.

In one specific aspect of the invention the coating compositions of the invention cure by two mechanisms. First, they cure as a result of free radical polymerization of the unsaturated moieties or cationic polymerization. Further, they cure by silanol condensation. The silanol condensation proceeds upon exposure to atmospheric moisture. Silanol condensation is catalyzed by acid, base or organic metallic catalysts, as described in U.S. Pat. No. 7,781,493 by Baikerikar et al. (incorporated by reference). The compositions of the invention generally will contain acidic containing compounds and may contain amines which catalyze the reaction. Alternatively, a suitable moisture cure catalyst may be added.

The coating composition may further include one or more other ingredients, such as are disclosed in U.S. Pat. No. 7,781, 493, by Baikerikar et al. (incorporated by reference) For example, among the additional optional ingredients that may be included in the coating composition are pigments, dyes, a dispersant or surfactant which stabilizes the dispersion of solid particles in the liquid medium and facilitates formation of a continuous void-free film, a surface active agent present to improve substrate wetting and the appearance of the coating, a defoamer and/or deaerator which prevents foaming or the formation of bubbles and which does not negatively impact the adhesive properties of the composition may be used, a polymerization inhibitor for preventing polymerization prior to exposure to curing conditions, compounds or polymers which improve the water resistance and/or adhesion of the composition to the substrate, colloidal silica acrylates for the purpose of improving hardness and abrasion resistance, a flexibilizer or rubber toughener can also be used to improve the flexibility and adhesion of the compositions, or any combination thereof.

It is contemplated that the coating compositions herein may be substantially free of any added pigment or dye. If added, however, pigments or dyes useful in the invention may be organic or inorganic. Preferable inorganic pigments include black iron oxides, zinc oxide, cerium oxide, titania ($TiO_2$), and infra-red (IR) reflective pigments, such as chromium green-black hematite, while preferable organic pigments include carbon black, phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines and mixtures thereof. A list of commercial pigments which are useful in the compositions of the invention are disclosed in U.S. Patent Application 2002/0086914 relevant portions incorporated herein by reference. Preferred pigments include carbon black or black iron oxides or black IR reflective pigments. If employed, the pigment or dye may be present in any suitable amount from about 1 to about 15 parts by weight of the coating (e.g., about 1, 2, 3, 4, 5, 8, 12 or even 15 parts by weight).

If employed, examples of dispersants which may be used according to the invention include the anionic surfactants for example, lignosulfonates, dialkyl sulfosuccinates, sulfated or sulfonated fatty acids or fatty acid esters of fatty acids, reaction products of ethylene oxide and/or propylene oxide with saturated or unsaturated fatty acids, fatty alcohols, fatty amines, alicyclic alcohols or aliphatic-aromatic hydrocarbons which have been esterified in the terminal position by an inorganic oxygen-containing acid or a polybasic carboxylic acid. Useful dispersants include the following non-ionic surfactants: ethylene oxide adducts from the class of the addition products of ethylene oxide with higher fatty acids, saturated or unsaturated fatty alcohols, fatty amines, mercaptans, fatty acid amides, fatty acid alkylol amides or fatty amines or with alkylphenols or with alkylthiophenols, with from 5 to 100 mol of ethylene oxide being used per mole of the mentioned compounds, as well as ethylene oxide-propylene oxide block polymers and ethylene-diamine-ethylene oxide-propylene oxide adducts. These include: reaction products of saturated and/or unsaturated fatty alcohols having from 8 to 20 carbon atoms with from 20 to 100 mol of ethylene oxide per mol of alcohol, preferably saturated linear $C_{16}$-$C_{18}$ alcohols with from 25 to 80 mol, especially 25 mol, of ethylene oxide per mol of alcohol; reaction products of saturated and/or unsaturated fatty acids having from 8 to 20 carbon atoms with from 5 to 20 mol of ethylene oxide per mol of acid; reaction products of alkylphenols having from 7 to 12 carbon atoms with from 5 to 25 mol of ethylene oxide per mol of phenolic hydroxy group, preferably mono- or dialkylphenols with from 10 to 20 mol of ethylene oxide per mol of phenolic hydroxyl group; reaction products of saturated and/or unsaturated fatty acid amides having up to 20 carbon atoms with from 5 to 20 mol of ethylene oxide per mol of acid amide, preferably oleic acid amides with from 8 to 15 mol of ethylene oxide per mol of acid amide; reaction products of saturated and/or unsaturated fatty amines having from 8 to 20 carbon atoms with from 5 to 20 mol of ethylene oxide per mol of amine, preferably oleylamines with from 8 to 15 mol of ethylene oxide per mol of amine; ethylene oxide-propylene oxide block polymers having from 10 to 80 percent ethylene oxide and molecular weights from 1,000 to 80,000; ethylene oxide-propylene oxide adducts with ethylenediamine. Another useful class of dispersants are polymeric dispersants and protective colloids, including amphiphilic copolymers, block copolymers or graft or comb polymers, especially those based on acrylic acid, methacrylic acid or salts thereof, hydroxyalkyl(meth) acrylic acid, aminoalkyl(meth)acrylic acid or salts thereof, 2-acrylamido-2-methylpropanesulfonic acid (AMPS) or salts thereof, maleic anhydride or salts thereof, (meth)acrylamide or substituted (meth)acrylamides, vinyl heterocycles, for example vinylpyrrolidone, vinylimidazole, as well as amphiphilic polymers containing segments of (polyethylene oxide) PEO or EO/PO (ethylene oxide/propylene oxide) copolymers. Examples of suitable protective colloids are polyvinyl alcohol, polyvinylpyrrolidone or its copolymers. Also suitable are copolymers of synthetic monomers, especially of monomers having carboxyl groups, for example copolymers of 2-vinylpyrrolidone with 3-vinylpropionic acid or maleic acid copolymers and salts thereof.

Most preferred dispersants and surfactants include polymeric amide hyperdispersants available from Noveon under the trademark SOLSPERSE 32000 and 39000 and polypropylene oxide based ammonium salts, such as diethylpolypropoxy methyl ammonium chloride available from Degussa under the trademark and designation VARIQUAT CC-59 and diethyl polypropoxy 2-hydroxy ammonium phosphate available from Degussa under the trademark and designation VARIQUAT CC-42NS, and phosphate acid esters such as RHODAFAC RS-610 and RE 610 available from Rhodia or unsaturated phosphate esters such as MAXEMUL 6106 and 6112 from Uniqema, and the like.

If employed, the dispersants may be used in any suitable amount, consistent with the teachings in U.S. Pat. No. 7,781, 493 by Baikerikar et al. (incorporated by reference). For example, any dispersants and/or surfactants may be employed in an amount of about 0.5 parts by weight or greater based on the weight of the composition, and most preferably about 1.0 parts by weight or greater. The dispersant and/or surfactant are preferably used in an amount of about 10 parts by weight or less, and most preferably about 5 parts by weight or less based on the weight of the coating composition.

If employed, for surface active agents for improving substrate wetting and the appearance of the coating, any surface active agent which is useful in improving the substrate wetting and appearance of the coating may be used. Examples include surface active agents having limited influence on intercoat adhesion, such as polydimethyl siloxanes with low silicone content, silicone acrylates, silicone-free wetting agents/surfactants, mixtures thereof and the like. More preferred surface active agents include polyether modified polydimethylsiloxanes with low silicone content, silicone acrylates, and silicone-free wetting agents which do not affect intercoat adhesion, siloxanes with various organic functional groups (such as carboxylic acid, amine, hydroxyl, acrylate, methacrylate, vinyl, epoxy, isocyanate, phosphonic acid, etc.), mixtures thereof and the like. One specific surface active agent includes one or more silicone acrylates, such as available from Tego Chemie (Degussa) under the trademark and designation TEGO RAD 2100, 2200N, 2250, 2300, and 2500 or the BYK UV 3500 series (3500, 3510, 3530, 3570) available from BYK Chemie, or siloxanes with various organic functional groups available under the SILMER series from Siltech Corporation, or one or more polyacrylates, such as MODAFLOW™ from UCB. The surface active agents are present in the composition in a sufficient amount to improve the surface appearance of the coating, substrate wetting and leveling. Preferably, the surface active agents are present in an amount of about 0.05 parts by weight or greater, even more preferably about 0.1 parts by weight or greater and most preferably about 0.2 parts by weight or greater based on the weight of the composition. The surface active agent is preferably present in an amount of about 2 parts by weight or less, more preferably about 1 part by weight or less based on the weight of the coating composition.

Any defoamer and/or deaerator which prevents foaming or the formation of bubbles and which does not negatively impact the adhesive properties of the composition may be used. Preferable defoamers are silicone defoamers, silicone free defoamers, polyacrylate defoamers, mixtures thereof and the like. More preferred defoamers include FOAM BLAST™ 20F, FOAM BLAST™ 30 and FOAM BLAST™ 550 polyacrylate defoamers available from Lubrizol; TEGO AIREX™ 920 polyacrylate defoamer and TEGO AIREX™ 980 from Degussa. SILMER ACR Di-10 and ACR Mo-8 polydimethylsiloxane acrylate copolymer from Siltech Corporation or FOAMEX N™ silicone based defoamers available from Degussa or BYK 1790 silicone-free defoamer from BYK Chemie. The defoamer/deaerator is present in the compositions of the invention in a sufficient amount to prevent formation of bubbles and/or foam, e.g., in an amount of about 0.05 parts by weight or greater based on the weight of the coating composition, and more preferably about 0.1 part by weight or greater. It is also possible to employ the defoamer/deaerator in an amount of about 1.0 part by weight or less based on the weight of the composition.

Any polymerization inhibitor which prevents polymerization of the functional groups contained in the composition may be used. Where the functional groups polymerize when exposed to free radicals, hydroquinones, phenothiazines (most preferable), mixtures thereof or the like may be used. Specific examples of polymerization inhibitors include 4-methoxyphenol(MEHQ), hydroquinone (HQ), 2,6-Di-tert-butyl-4-methylphenol, i.e. butylated hydroxytoluene (BHT), phenothiazine, 2,2,6,6-Tetramethyl-4-hydroxypiperidine-1-oxyl, such as XENOXYL available from Avecia, 2,2,6,6-tetramethylpiperidinyl-1-oxide (TEMPO), IRGASTAB UV 10 from Ciba, ADDITIVE™ 01-468 or GENORAD™ 16 available from Rahn. Preferably, the polymerization inhibitor is present in an amount of about 0.01 weight parts or greater, more preferably about 0.05 weight parts or greater, and most preferably about 0.1 weight parts or greater based on the weight of the coating composition. Preferably, the polymerization inhibitor is present in an amount of about 2 and more preferably about 1 parts or less based on the weight of the coating composition.

Among compounds for improving water resistance and/or adhesion of the composition to the substrate are polybutadiene acrylates, fluorinated acrylates or fluorosilanes, silylated polymers (such as the reaction products of isocyanatosilanes and hydroxy functional acrylates or aminosilanes and multi-functional acrylates). To improve weatherability, the following components may be added: hindered amine light stabilizers, such as TINUVIN™ 123, 152, 292, or 5100 from Ciba Geigy or SANDUVOR™ TB-02 or 3058 from Clariant, ultraviolet absorbers or stabilizers such as TINUVIN™ 400, 479, R600, R796 or 1130 available from Ciba Geigy, SANDUVOR™ PR-31 available from Clariant or HOMBITEC™ RM 300 available from Sachtleben. The compositions may further include antioxidants, such as IRGANOX™ 1035 or 1076 from Ciba Geigy or ETHANOX™ 376 and ETHAFOS™ 368 from Albemarle. The compositions also may include moisture scavengers to improve the hydrolytic stability of the composition. Any moisture scavenger known in the art which does not interfere with the functioning of the composition may be used. Among preferred moisture scavengers are vinyltrimethoxysilane, oligomeric vinyltrimethoxysilane (such as DYNASYLAN 6490 from Degussa), triethylortho-formate, triethylorthoacetate and molecular sieve powders such as SYLOSIV™ from Grace Davison.

Among preferred colloidal silica acrylates are silica nanoparticle dispersions in acrylates such as isobornyl acrylate, hexanediol diacrylate, tripropylene glycol diacrylate propoxylated neopentyl glycol diacrylate, propoxylated glyceryl triacrylate, trimethylolpropane triacrylate, ethoxylated trimethylolpropane triacrylate, cyclic trimethylolpropane formal acrylate, hydroxy functional acrylates (i.e. hydroxyethyl (meth)acrylate), alkoxylated pentaerythritol tetraacrylate, or acrylate oligomers. Such dispersions are available from Clariant under HIGHLINK NANO and from Hanse-Chemie under NANOCRYL. Colloidal alumina nanoparticle dispersions in acrylate monomers, such as NANODUR from Nanophase Technologies, or NANOBYK from BYK-Chemie could also be used. In addition, polyethylene, polytetrafluoroethylene or polypropylene wax dispersions in acrylate monomers, such as the EVERGLIDE or S-390 or SST series of products from Shamrock Technologies, or polyamide particles such as ORGASOL from Arkema could be used to further improve scratch resistance and the slip. Alternatively, the wax can be added in powder form. The wax dispersions are preferably present in an amount of about 0.5 parts by weight or greater and preferably about 1 or greater. The wax dispersion is present in an amount of about 10 parts by weight or less.

Examples of flexibilizers are thermoplastic acrylic bead resins such as ELVACITE™ thermoplastic acrylic bead resins from Lucite (Ineos Resins) or HYCAR liquid butadiene resins from Noveon.

The resulting coating compositions herein (or the adhesion promotion additive) may contain one or more auxiliary resins, including but not limited to one or more additional or alternative film forming resins to those already disclosed, and having at least one functional group capable of polymerization and/or one or more reactive diluents capable of reacting with such film forming resin and/or any of the film forming resins already disclosed in the above discussion. Examples of auxiliary film forming resins include the film-forming resins taught in U.S. Pat. No. 7,781,493 (incorporated by reference), The auxiliary film-forming resin may contain functional groups which polymerize when exposed to free radicals, such as vinyl, acrylate, styrenic, diene, methacrylate, allyl, thiolene, vinyl ether, unsaturated ester, imide, N-vinyl, acrylamide containing moieties, mixtures thereof or the like. In a more preferred embodiment, the functional groups on the film-forming resin are acrylic and/or methacrylic moieties. In many embodiments, the film-forming resin is an oligomer or prepolymer having the described functional moieties. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, metallic acrylates (i.e. zinc containing acrylates), amido acrylates, chlorinated polyester acrylates, allylic oligomers, anhydride/carboxylic acid-containing aromatic acid acrylate/methacrylate half ester oligomers, hyperbranched acrylates, imide/ester/amide-containing acrylates self-initiating oligomers (e.g., oligomers that use small amounts or substantially no photoinitiator), acrylated phenoxy oligomers, acrylamidomethyl substituted cellulose esters, dual-functional acrylated oligomers (i.e. containing acrylates and either hydroxyl, isocyanate, carboxylic acid, anhydride, or epoxy groups), and Spiro ortho carbonate esters or mixtures thereof. One specific class of oligomers and prepolymers includes aliphatic urethane acrylates, commercial examples of which include those from Cytec Surface Specialties under the trademark EBECRYL and designations 244, 264, 265, 284N, 1290, 4833, 4866, 8210, 8301, 8402, 8405, 8807, 5129 and 8411; those available from Sartomer under the designations CN985B88, 964, 944B85, 963B80, CN 929, CN 996, CN 968, CN 980, CN 981, CN 982B90, CN 983, CN991; CN 2920, CN 2921, CN 2922, CN 9001, CN 9006, CN 9008, CN 9009, CN 9010; GENOMER 4302 and 4316 and UA 00-022 available from Rahn; PHOTOMER 6892 and 6008 available from Cognis; NK OLIGO™ U24A and U-15HA™ available from Kowa. Additional suppliers of aliphatic urethane acrylates include the BR series of aliphatic urethane acrylates such as BR 144 or 970 available from Bomar Specialties or the LAROMER series of aliphatic urethane acrylates such as LAROMER LR 8987 from BASF.

The auxiliary film-forming resin may be present in any suitable amount (e.g., about 10 parts by weight or greater and more preferably about 15 parts by weight or greater, based on the weight of the coating composition, or so that the total resin content is about 10 parts by weight or greater and more preferably about 15 parts by weight or greater). Preferably, the film-forming resin (or the total resin content) is present in the composition in an amount of about 70 parts by weight or less based on the weight of the coating composition and more preferably about 60 parts by weight or less, more preferably about 50 parts by weight or less and most preferably 40 parts by weight or less of the coating.

The composition optionally may further comprise a reactive diluent in sufficient amounts to achieve the desired viscosity. The reactive diluent may be monofunctional or polyfunctional, as those terms are described in U.S. Pat. No. 7,781,493, by Baikerikar et al. (incorporated by reference). Preferably, the reactive diluent has unsaturated compounds which polymerize when exposed to free radicals or compounds which react via cationic reaction mechanisms. Examples of functional moieties which may be used in the reactive diluent include vinyl, acrylate, styrenic, diene, methacrylate, allyl, acrylamide, methacrylamide, cycloaliphatic epoxide, alpha epoxide, acrylonitrile, and methacrylonitrile containing moieties, combinations thereof or the like. Preferred functional groups are those functional groups which polymerize when exposed to free radicals. Among preferred functional groups which polymerize when exposed to free radicals are vinyl, acrylate, styrenic, diene, methacrylate, and allyl containing moiety, combinations thereof and the like. Representative examples of monofunctional reactive diluents useful include styrene, alpha-methylstyrene, substituted styrene, vinyl ester, vinyl ether, N-vinyl-2-pyrrolidone; (meth)acrylamide, N-substituted (meth)acrylamide, octyl (meth)acrylate, nonylphenol ethoxylate (meth)acrylate, isononyl (meth) acrylate, isobornyl (meth)acrylate, 2-(2-ethoxyethoxyl)ethyl (meth)acrylate, 2-ethylhexyl (meth)acrylate, lauryl (meth)acrylate, beta-carboxyethyl (meth)acrylate, isobutyl (meth)acrylate, 3,3,5-trimethylcyclohexyl (meth) acrylate, cyclic trimethylolpropane formal (meth)acrylate, cyclohexyl (meth)acrylate, dihydrodicyclopentadienyl acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth) acrylate, (meth)acrylic acid, N-vinylcaprolactam, N-vinylformamide, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth) acrylate, hydroxyisobutyl (meth)acrylate, tetrahydrofurfuryl (meth) acrylate, combinations of these, and the like. In one preferred embodiment, the reactive diluent is a monofunctional acrylate. Among preferred monofunctional acrylates are 2-(2-oxyl)ethyl acrylate, 2-phenoxy ethyl acrylate, hydroxyl ethyl acrylate, other long chain alkyl acrylates, isobornyl acrylate, cyclic trimethylol propane formal acrylate, 3,3,5-trimethylcyclohexyl (meth)acrylate, monofunctional aliphatic urethane acrylates, mixtures thereof and the like. In a more preferred embodiment, the reactive diluent is a polyacrylate. Examples of polyacrylate reactive diluents include ethylene glycol di(meth)acrylate, hexanediol di(meth)acrylate, triethylene glycol di(meth)acrylate, butylene glycol di(meth)acrylate, tetraethylene glycol di(meth)acrylate, dipropylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, tris (2-hydroxyl-ethyl)isocyanurate triacrylate, ditrimethylolpropane tetra(meth)acrylate, and alkoxylated polyol derived di or polyacrylates, such as propoxylated neopentyl glycol diacrylate or propoxylated glycerol triacrylate, neopentyl glycol di(meth)acrylate, combinations of these, and the like. Preferred reactive diluents are diacrylates such as 1,6 hexanediol diacrylate, 1,9 nonanediol diacrylate, 1,4 butanediol acrylate, tricyclodecane dimethanol diacrylate, cyclohexane dimethanol diacrylate, cis/trans 1,3/1,4 cyclohexanedimethanol diacrylate, alkoxylated cyclohexane dimethanol diacrylates, tripropylene glycol diacrylate and the like. More preferred reactive diluents include propoxylated neopentyl glycol diacrylate, propoxylated glyceryl triacrylate and tripropylene glycol diacrylate, and cis/trans 1,3/1,4 cyclohexanedimethanol diacrylate. Among the most preferred monofunctional acrylate monomers is isobornyl acrylate.

Preferably, the reactive diluent is present in an amount of about 2, more preferably about 5 and still more preferably about 10 parts by weight or greater, based on the weight of the coating composition. The reactive diluent is preferably present in an amount of about 30, more preferable about 25 and still more preferably about 20 parts by weight or less, based on the weight of the coating composition.

In a preferred embodiment, a mixture of reactive diluents may be used, such as a blend of monofunctional, difunctional, and trifunctional diluents. Preferably, in such instance, any reactive diluent with a functionality of greater than 2 is present in an amount of about 1 part by weight of the coating or greater, more preferably about 3 parts by weight or greater and most preferably about 4 parts by weight or greater. Preferably, the reactive diluent having a functionality greater than 2 is present in an amount of about 15 parts by weight or less and more preferably about 12 parts by weight or less and most preferably about 10 parts by weight or less of the coating.

The resulting coating composition preferably has a viscosity which allows it to be processed for application to a substrate. The specific viscosity that may be used will be dictated by the application method. For instance, formulations for screen printing will require much higher viscosity than formulations used for ink jet printing: For example, if the composition is applied by screen printing the coating composition typically has a viscosity of about 2,000 centipoises or greater and more preferably about 5,000. Preferably, the coating composition has a viscosity of 50,000 centipoise or less. If the coating composition is applied by ink jet printing, the composition has a viscosity of 5 centipoises or greater. Preferably, the coating composition has a viscosity of 50 centipoises or less. If the coating composition is applied by spraying it onto the substrate, the composition has a viscosity of 5 centipoises or greater. Preferably, the coating composition has a viscosity of 100 centipoises or less.

The coating composition of the invention may be prepared by contacting the ingredients and blending, using art-disclosed techniques. In one preferred approach, the materials are contacted under conditions such that a stable homogeneous dispersion is prepared. The materials may be contacted at about ambient temperature (about 20-25° C.) to about 60° C. and preferably at ambient temperature. The components may be blended in air and preferably blended in a dry environment to improve the hydrolytic stability of the composition. Preferably, the materials are blended for about 60 minutes or greater, more preferably about 90 minutes or greater. Preferably, the materials are blended for a period of about 240 minutes or less and more preferably about 180 minutes or less. The coating composition optionally may be subjected to a grinding step. This grinding may occur in any equipment known to those skilled in the art for performing such grinding (i.e. ball milling, horizontal or vertical media milling, sand or pebble milling, etc). Preferably, the composition is stored in a dry environment.

The coating composition may be applied to glass or coated plastic in any art-disclosed means, such as using a brush, roller, sprayed onto the surface, ink jet printing, screen printing and the like. It may be applied using art-disclosed robotic application devices (e.g., one having at least 2 axes of motion). After application of the coating composition to the surface of the substrate, it is exposed to polymerization conditions, such as one or more operations which causes the catalyst or initiator to initiate the formation of free radicals and free radical polymerization. In a preferred embodiment, the catalyst or initiator is a photoinitiator and polymerization is initiated by exposing the composition to irradiation, such as ultraviolet light or electronic beam. The energy source used for achieving crosslinking of the radiation functionality may be actinic (e.g the radiation having a wavelength in the ultraviolet or visible region of the spectrum), accelerated particles (e.g., electron beam radiation), thermal (e.g., heat or infrared radiation), or the like. Preferably, the energy source is actinic radiation or accelerated particles, because such energy source provides excellent control over the initiation and rate of crosslinking. Additionally, actinic radiation and accelerated particles can be used for curing at relatively low temperatures. Suitable sources of actinic radiation include mercury lamps, electrodeless lamps, xenon lamps, carbon arc lamps, tungsten filament lamps, lasers, electron beam energy, sunlight, and the like. Ultraviolet radiation, especially from xenon lamps, medium pressure mercury lamps or electrodeless lamps is most preferred.

Substrates that may be coated with the coating compositions including adhesion promotion additives of the present invention may include any suitable substrate for receiving the composition. The substrate may be surface treated or not over some or all of the coated portions. Substrate materials may be metal, ceramic, plastic, or any combination thereof. Substrates may be in any form, such as sheets, films, foils, plates, bars, rods, wires, fabric or otherwise. The substrate may be solid or porous. The substrate may be woven or unwoven. The substrate may have a smooth surface finish, a roughened surface finish, or a combination thereof over some or all of the coated portion. The substrates herein, in one particular aspect, may be transparent (i.e., optically transparent) over at least a portion of its volume. For example, because the invention herein is particularly useful for encapsulating to a window or other panel (e.g., an automotive windshield, backlight, sidelight, light lens, mirror, sun roof, gauge lens, or the like), typically, the substrates will be panels that are transparent through at least one surface, and particularly through both opposing surfaces, over at least about 25% of the area of the surface, and more specifically, at least a majority (e.g., at least about 60%, 75% or even 90% of the area of the surface).

In a particular embodiment, the substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls, polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Illustrative materials are also described at cols. 11-12 of U.S. Pat. No. 7,129,444 (incorporated by reference).

The substrates herein typically will include at least one surface onto which the coating composition is applied. The surface may optionally be treated for improving the bond strength of the coating to the substrate, e.g. by a primer, a flame spray, a corona treatment, a plasma treatment, or some other surface treatment. However, in one specific example, the outer surface is substantially free of any surface treatment. Accordingly, upon application, the coating composition is in direct intimate contact with the substrate, and particularly in the substantial absence any intermediate layer. Of course, after applying the composition to the substrate it is also possible to apply over some or all of one or both of the composition and substrate a further layer (e.g., a silicone, an acrylic, a polyurethane, or otherwise, for realizing a protective overlayer), such as is disclosed in columns 12-14 of U.S. Pat. No. 7,129,444 (incorporated by reference). It is also possible that the coating composition herein may be employed over, beneath and/or adjacent a frit (e.g., a frit of the type taught in U.S. Pat. No. 7,781,493 by Baikerikar et al. (incorporated by reference).

When applied, the coating composition herein generally will have a thickness of up to about 250 microns or higher. More commonly it will be less than about 150 microns, less than about 100 microns or even less than about 50 microns (e.g., about 10 to about 0.30 microns or smaller).

Though some applications may call for the coating of substantially an entire surface of a substrate with the coating composition herein, ordinarily the coating compositions will be applied to the substrates selectively (e.g., by a screen printing, ink-jet printing or other application technique), according to a predetermined pattern (e.g., substantially along an edge portion of the substrate, about the periphery of the substrate, within an interior or central portion of a substrate, or otherwise). For example, one approach is to apply the coating from the edge of the substrate inwards toward the central portion in a width of about 2, 5, 8, or even 12 cm or greater. It is also possible that the coating composition may be applied for defining one or more lines, curves, dots, or other geometric configurations comprising segments of constant or varying width height, length or other dimension. For example, the coating composition can be applied to have a frit pattern.

Furthermore, it is contemplated that in addition to the coating composition, the present invention may optionally include a frit (e.g., ceramic frit). As such, it is appreciated that the coating composition may be utilized in place of the frit or in combination therewith. For example, the coating composition, the frit, or a combination thereof may be capable of blocking transmission of light to prevent it from contacting the adhesive, which bonds the window into a structure. Such coating, frit, or a combination thereof on the periphery may be also capable of hiding trim components disposed about the periphery of the window.

For a particular aspect of the invention, the coating composition is one that is capable of being applied to a substrate as a liquid, a paste, a solid or any combination thereof. Thereafter, it hardens, and also bonds to the substrate, while affording generally abrasion resistant, thermally stable, and light stable composition such that it may be advantageously employed in environments common for automotive or other applications.

In a specific embodiment, the invention is employed on glass or abrasion resistant coated plastic having a cured coating composition of the invention deposited on the surface. The glass or plastic can be flat or shaped, e.g., for defining a curved surface. One aspect of the present invention contemplates applying the coating composition to a substrate and thereafter shaping the substrate. Optionally, or as an alternative, applying the coating composition onto a substrate that has been shaped prior to the application of the coating composition. Glass or coated plastic with a coating of the invention can be used for any use for which glass or coated plastic is known to be used by one skilled in the art. Preferably, the glass or coated plastic is used as a window and the coating is found on the periphery of the window. In one aspect the coating composition herein is applied about the periphery of the window such that it is capable of blocking transmission of light to prevent it from contacting the adhesive, which bonds the window into a structure. Such coating on the periphery also hides the trim components disposed about the periphery of the window. It is also possible that a conventional ceramic frit is employed on the periphery, or an organic frit of the type disclosed in co-pending U.S. Pat. No. 7,781,493 by Baikerikar et al. (incorporated by reference). Accordingly, for use as a peripheral frit, desirably, the any such coating exhibits an ultraviolet light transmission of about 1 percent or less of the light to which the coating is exposed to and more preferably about 0.5 percent or less.

In one preferred embodiment, the substrate herein is glass that is curved, and more preferably, the glass is pre-shaped prior to application of the coating composition herein. Preferably the cured coating composition demonstrates an abrasion resistance such that after 500 cycles according to ASTM D1044 test the coating retains a light transmittance of less than 1 percent. Preferably, the coating demonstrates an abrasion resistance of about (delta) Δ percent T<1 percent, more preferably about (delta) 4 percent T<0.75 percent, and most preferably about (delta) Δ percent T<0.5 percent, as determined according to the test ASTM D1044. It is also possible that the substrate will be a plastic substrate. After applying the coating composition, the substrate is heated and deformed (e.g., by thermoforming).

It is also possible that the assemblies herein may be secured in place (e.g., in an opening of an automotive vehicle) by use of an adhesive. For example an adhesive bead may be located about the periphery of the assembly. The adhesive bead located about the periphery of the window can be any known adhesive bead useful in bonding windows into structures. In one embodiment, the adhesive can be an isocyanate functional, siloxy functional or combination of isocyanate and siloxy functional adhesive which cures when exposed to moisture. The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions incorporated herein by reference. Examples of commercial adhesives which may be used herein are BETASEAL™ 15630N, 15625N, 15845N adhesives available from The Dow Chemical Company. EFBOND™ windshield adhesives available from Eftec, WS 151™, WS212™ adhesives available from Yokohama Rubber Company, and SIKAFLEX™ adhesives available from Sika Corporation.

It is contemplated that the adhesive may be based upon one or more of polymeric component (e.g., an isocyanate terminated prepolymer or other polymer), and which may include a pigment, a catalyst (e.g., a catalyst including Morpholine, 4,4'(oxydi-2,1-ethanediyl)bis (DMDEE)), or other ingredient (e.g., filler, such as clay, one or more silanes (e.g., an epoxy silane)) and employed as OEM adhesives, aftermarket adhesives, otherwise, or any combination thereof. Accordingly, a modified silicone (MS) polymer based adhesive such as Kaneka adhesives may be utilized. One type of Kaneka adhesive may include one or more of SAX 400 polymer, SILIQUEST™ (A-1170) (epoxy silane), carbon black, U220 tin catalyst, UV & heat stabilizer package, the like, or otherwise.

Another adhesive such as Betaseal U-418 (HV) may be utilized being formed from a mixture of one or more of isocyanate terminated prepolymer, carbon black, DMDEE catalyst (e.g.,), the like, or otherwise and combinations thereof. Additionally, another adhesive such as Betaseal Express may be utilized and formed from a mixture of one or more of isocyanate terminated prepolymer, carbon black and clay, DMDEE/Bismuth Octoate, 0.25% SILQUEST™ A-187 (epoxy silane), the like, or otherwise and combinations thereof. Furthermore, another adhesive such Betaseal One may be utilized and formed from a mixture of one or more of isocyanate terminated prepolymer, polyester based prepolymer, carbon black and clay, DMDEE/Bismuth Octoate, 0.25% SILQUEST™ A-187 (epoxy silane), the like, or otherwise and combinations thereof.

It is appreciated that the coating compositions may have an open time defined as the elapsed time between application of the coating composition and application of adhesive thereto that may be a short open time, or a combination of both. Typically, though not required at least 7 days post curing of the coating composition is preferred before the adhesive is applied.

By way of example, Table 1 illustrates the expected results of Quick Knife Adhesion (QKA) Test for open time of a 1-year old coated glass with Aftermarket Repair Glass (ARG) bonding adhesives. The glass substrate is contacted with a coating composition and cured. After an open time of 1-year, an adhesive is applied to the coated glass substrate. More specifically, in one aspect of Table 1, a Dry Wipe of the 1-year old coated glass substrate is performed prior to the application of the adhesive. After applying the adhesive and once the adhesive has cured for about 7 days at room temperature the QKA test is conducted on the adhesively bonded glass substrate to obtain the expected results. In another aspect of Table 1, a Dry Wipe of the 1-year old coated glass substrate is preformed prior to the application of the adhesive. After applying the adhesive and once the adhesive has cured for about 7 days at room temperature, the adhesively bonded glass substrate is exposed to at 38° C. and 100% humidity for 14 days. The QKA test is conducted on the adhesively bonded substrate to obtain the expected results. In another aspect of Table 1, an Isopropanol (IPA) Wipe of the 1-year old coated glass substrate is performed prior to the application of the adhesive. After applying the adhesive and once the adhesive has cured for about 7 days at room temperature the QKA test is conducted on the adhesively bonded glass substrate to obtain the expected results. In yet another aspect of Table 1, an IPA Wipe of the 1-year old coated glass substrate is preformed prior to the application of the adhesive. After applying the adhesive and once the adhesive has cured after 7 days at room temperature, the adhesively bonded glass substrate is exposed to at 38° C. and 100% humidity for 14 days. The QKA test is conducted on the adhesively bonded glass substrate to obtain, the expected results. The tests are repeated using three different adhesives such as BETASEAL™ One, BETASEAL™ Express, and BETASEAL™ 369 N adhesive As discussed herein, the expected results for component failure are defined in the following Tables as percentages of one or more of Cohesive Failure (CF) of adhesive to the coating, Primer or Coating Failure (PF) to the substrate, and Adhesion Failure (AF).

TABLE 1

|  | BETA-SEAL™ One | BETA-SEAL™ Express | BETA-SEAL™ 369N (Warm applied) |
| --- | --- | --- | --- |
| DRY WIPE | | | |
| 1. 7 day RT cure | 100CF | 100CF | 100CF |
| 2. 14 days at 38° C./100% humidity | 100CF | 70% light (smear) CF, 30AF | 100CF |
| Isopropanol (IPA) WIPE | | | |
| 1. 7 day RT cure | 100CF | 100CF | 100CF |
| 2. 14 days at 38° C./100% humidity | 100CF | 70CF, 30AF | 100CF |

The compositions herein can be employed in any of a variety of applications, including but not limited to those addressed already and in U.S. Pat. No. 7,781,493 by Baikerikar et al., the contents of which are hereby incorporated by reference in their entirety. For example, in the context of automotive vehicle applications involving a transparent substrate (such as a window, and specifically a panel made from glass, plastic or a combination thereof), compositions may be employed as part of an encapsulated panel assembly, such as is disclosed in U.S. Patent Publication 2008-0213545A1 entitled "Encapsulated Panel Assemblies and Methods for Making Same" the contents of which are hereby incorporated by reference in their entirety. Thus, in general, the substrate will include an encapsulation joint that substantially adjoins (and may even at least partially surround) a transparent portion. The substrate thus may further include one or more additional art-disclosed layers (e.g., for resisting abrasion, for resisting ultraviolet radiation, for containing fragments in the event of breakage, for heating, for use as an antenna, or any combination thereof). An example of one approach to treating substrates for making a heater, an antenna and/or another conductive element is disclosed in commonly owned U.S. Patent Publication 2008-0152926A1, entitled: "Improved Composites And Methods For Conductive Transparent Substrates", the contents of which are hereby incorporated by reference in their entirety. Furthermore, the substrate may also include a coating composition as described in U.S. Patent Publication 2009-0162592 filed Dec. 18, 2007 by Baikerikar et al., entitled "Protective Coating For Window Glass Having Enhanced Adhesion To Glass Bonding Adhesives," the contents of which are hereby incorporated by reference in their entirety.

Another aspect of the invention also contemplates a step of recycling a substrate including a coating composition thereon. The coating composition can be removed from the substrate and the coating composition (or constituents thereof) reclaimed, the substrate material reclaimed or both.

Example

Michael adducts are prepared according to the Examples 15 and 33 of co-pending U.S. patent application Ser. No. 11/472,119 filed Jun. 20, 2006 (priority to 60/692,318 filed Jun. 20, 2005), by Baikerikar et al. (incorporated by reference), by adding 0.03 mol of bis[3-(triethoxysilyl)-propyl] amine, DYNASYLAN™ 1122, Degussa to 0.03 mol propoxylated neopentyl glycol diacrylate monomer (SR™ 9003, Sartomer) in a glass bottle and mixing with a vortex mixer for 1 minute. The resulting solution is heated at 55° C. for at least 3 days to complete the reaction and graft the amino silane to the acrylate. The resulting Michael addition product is confirmed by C-13 NMR and GPC.

The Michael addition product is admixed in an amount of about 15 parts by weight, along with acrylic acid in an amount of about 5 parts by weight, with about 80 parts by weight of NAZDAR 1852. The admixture is applied to a substrate and cured by exposure to a XENON™ UV lamp, followed by a room temperature cure of 7 days at 50% relative humidity. The resulting coated substrate is subjected to pencil hardness testing, according to ASTM D3363; cross-hatch/tape peel adhesion test according to ASTM D3359; quick knife adhesion testing (QKA) as described in U.S. Pat. No. 7,781,493, by Baikerikar et al. (incorporated by reference), and 90° C. water immersion testing (for a period of 5 days). For adhesion testing requiring an adhesive, various commercially available adhesives under the designation BETASEAL® (e.g., grades 15625, 15630, and 61355) from Dow Chemical are used. Good results are also obtained when a mixture of Michael addition products are employed, and particularly a mixture (e.g., made by speed mixing at about 3000 rpm for about 5 minute) that includes the above reaction product in combination with a second reaction product, specifically, the reaction product as described above (the first reaction product) but prepared with bis[3-(trimethoxysilyl)-propyl]amine substituted for bis[3-(triethoxysilyl)-propyl]amine.

Table 2 illustrates expected results for 90° C. water immersion quick knife adhesion (QKA) test with various aftermarket adhesives.

TABLE 2

|  | BETA-SEAL™ 418HV | BETA-SEAL™ One | BETA-SEAL™ Express | MS Polymer |
| --- | --- | --- | --- | --- |
| 1 day | 40CF; 60PF | 100CF | 100CF | 100CF |
| 2 day | 75CF; 25AF | 100CF | 90CF; 10AF | 100CF |
| 3 day | 50CF; 50AF | 50CF; 50AF | 90CF; 10AF | 100CF |
| 4 day | 50CF; 50AF | 100AF | 50CF; 50AF | 100CF |
| 5 day | 10CF; 90AF | 25CF; 75AF | 75CF; 25AF | 100CF |

By way of example, Table 3 provides the composition of one embodiment of the present invention that is a one-component Dow UV curable coating as compared the compositions of four different commercially available two-component systems that are employed in relative concentrations.

TABLE 3

| Description | Dow UV cured coating | NAZDAR UV cured coating | NAZDAR Thermal cured coating 70° C. for 5 min and post cured at room temp for 7 days | RUCO UV cured coating | MARABU UV cured coating |
|---|---|---|---|---|---|
| 1852 | | 95 | | | |
| NB80 | | 5 | | | |
| 935 | | | | 96 | |
| 100VR-140 | | | | 4 | |
| UVG0980 | | | | | 98 |
| UVHV8 | | | | | 2 |
| ADE 52 | | | 95 | | |
| ADE677 | | | 5 | | |
| Coating Composition of the Present Invention | 80 | | | | |
| Adhesion Promoter of the present Invention | 15 | | | | |
| Acrylic acid | 5 | | | | |
| TOTAL | 100 | 100 | 100 | 100 | 100 |

Table 4 illustrates the expected results of the one-component system as compared to the four different commercially available two-component systems as set in Table 3.

TABLE 4

| Description | Dow UV cured coating | NAZDAR UV cured coating | NAZDAR Thermal cured coating 70° C. for 5 min and post cured at room temp for 7 days | RUCO UV cured coating | MARABU UV cured coating |
|---|---|---|---|---|---|
| 1. Pencil Hardness (ASTM D3363) | | | | | |
| Test 1 | 1400 | 200 | 600 | 300 | 200 |
| Test 2 | 1300 | 200 | 700 | 200 | 200 |
| Test 3 | 1400 | 100 | 700 | 300 | 300 |
| 2. Cross Hatch (ASTM D3359) | | | | | |
| Test 1 | 5B | 3B | 4B-5B | 2B-3B | 3B |
| Test 2 | 5B | 3B | 4B-5B | 3B | 3B |
| 3. Adhesion (QKA at Room Temp) | | | | | |
| Betaseal 15630N | 100CF | 0CF | 100CF | 0CF | 0CF |
| Betaseal 15625N | 100CF | 0CF | 100CF | 0CF | 0CF |
| Betaseal 15845N | 100CF | 0CF | 100CF | 0CF | 0CF |
| 90° C. Water Immersion (Coating Only) | | | | | |
| Sample 1 | | | | | |
| 1 day | Good | 100PF | Good | 30% bubbling | 100PF |
| 2 days | Good | | 100PF | stop testing | |
| 3 days | Good | | | | |

Table 5 provides the composition of a system employing one of the commercially available coating composition as shown in Tables 3 and 4 (e.g., NAZDAR™ 1852), an adhesion promoter of the present invention (e.g., Micheal adduct), and an acrylic acid.

TABLE 5

| Description | NAZDAR 1852 + Dow Micheal aduct + Acrylic Acid |
|---|---|
| 1852 | 80 |
| NB80 (not included) | |
| Michael adduct adhesion promoter | 15 |
| Acrylic acid | 5 |
| TOTAL | 100 |
| 1. Pencil Hardness (ASTM D3363) | |
| Test 1 | 400 |
| Test 2 | 400 |
| Test 3 | 500 |
| 2. Cross Hatch (ASTM D3359) | |
| Test 1 | 2B-3B |
| Test 2 | 3B |
| 3. Adhesion (QKA at Room Temp) | |
| BETASEAL ™ 15630N | 0CF |
| BETASEAL ™ 15625N | 0CF |
| BETASEAL ™ 15845N | 0CF |
| 90° C. Water Immersion (Coating Only) | |
| Sample 1 | |
| 1 day | Good |
| 2 days | Good |

TABLE 5-continued

| Description | NAZDAR 1852 + Dow Micheal aduct + Acrylic Acid |
|---|---|
| 3 days | Good |
| 4 days | Good |
| 5 days | Good |
| Sample 2 | |
| 1 day | Good |
| 2 days | Good |
| 3 days | Good |
| 4 days | Good |
| 5 days | Good |

Furthermore is it shown in Table 5 the expected results of the system including the Nazdar 1852 of Tables 3 and 4 combined with the adhesion promoter according to the teachings of the present invention. The results of Table 5, when compared to the NAZDUR™ UV cured two-component system of Tables 3 and 4, is believed to show improvements in pencil hardness, cross hatch, adhesion, and water immersion tests. It is believed that the expected results of Table 5 may be achieved in various coating compositions that are substantially free of compounds that react with the acrylic acid thereby possibly causing a gelling affect of the resulting composition.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. References to an acrylic or (meth)acrylic (or derivative terms such as "acrylate") contemplate meth-acrylics and acrylics (and corresponding derivative terms). Ingredients discussed herein may form part of the resulting composition. However, they also may form part of the adhesion promotion additive. For example, it is possible that the adhesion promotion additive is a vehicle for delivering an ingredient into an admixture for forming the resulting composition. The present invention also contemplates kits for improving coating compositions, which kits include or even consist essentially of an adhesion promotion additive as described herein, and optionally a base composition and/or one or more other ingredients as taught herein.

What is claimed is:

1. A coating composition, comprising:
   a. a resin selected from an epoxy, an acrylic, a polyurethane, or any combination thereof in the form of a resin dispersed in one or more unreactive solvents;
   b. a colorant;
   c. an additive comprising a Michael addition product of an amino alkoxy silane and a compound having two or more acrylate groups the Michael addition product having 4 or greater alkoxy silane groups, at least one unsaturated group and all of the amine groups are tertiary; and
   a unsaturated carboxylic acid, a unsaturated sulfonic acid, a unsaturated phosphonic acid, or any combination thereof,
   wherein the Michael Addition product to acid weight ratio is about 1:1 to about 10:1.

2. A coating composition according to claim 1 wherein the Michael addition product contains 6 or greater alkoxy silane groups.

3. A coating composition according to claim 1 wherein the Michael Addition product to acid weight ratio is about 2:1 to about 5:1.

4. The coating composition of claim 1 wherein the composition is cured by a free radical reaction, and the Michael addition product is a reaction product of (i) bis[3-(trimethoxysilyl)-propyl]amine, bis[3-(triethoxysilyl)-propyl]amine or a mixture thereof; and (ii) a polyacrylate monomer.

5. The coating composition of claim 4, wherein the pdyacryate monomer is a propoxylated neopentyl glycol diacrylate monomer.

6. The coating composition of claim 5, wherein the composition includes a photoinitiator, a filler, or both.

7. The coating composition of claim 6, wherein the carboxylic acid is an acrylic acid, a methacrylic acid.

8. The coating composition of claim 7, wherein the composition is a printing ink, is employed as a one component composition, or both.

9. A kit for preparing a coating composition, comprising:
   a first part comprising a base composition; and
   a second part comprising an adhesion promotion additive comprising a Michael addition product of an amino alkoxy silane and a compound having two or more acrylate groups the Michael addition product having 4 or greater alkoxy silane groups, at least one unsaturated group and all of the amine groups are tertiary and a compound including an acid moiety and unsaturation, wherein the Michael Addition product to the compound including an acid moiety weight ratio is about 1:1 to about 10:1;
   wherein the second part is packaged separately from the first part for mixing h parts together at a remote location.

10. The kit of claim 9 wherein the acid moiety is f carboxylic acid, a sulfonic acid, a phosphoric acid, or any combination thereof.

11. A kit according to claim 9 wherein the addition product contains 6 or greater alkoxy silane groups.

12. kit according to claim 9 wherein the base composition comprises a resin selected from an epoxy, an acrylic, a polyurethane, or any combination thereof in the form of a resin dispersed in one or more organic solvents.

13. A kit according to claim 9 wherein the Michael Addition product to the compound including an acid moiety weight ratio is about 2:1 to about 5:1.

* * * * *